US010554557B2

(12) United States Patent
Merlin et al.

(10) Patent No.: US 10,554,557 B2
(45) Date of Patent: Feb. 4, 2020

(54) METHODS AND APPARATUS FOR ACKNOWLEDGMENT OF MULTI-USER UPLINK WIRELESS TRANSMISSIONS

(71) Applicant: QUALCOMM Incorporated, San Diego, CA (US)

(72) Inventors: Simone Merlin, San Diego, CA (US); Gwendolyn Denise Barriac, Encinitas, CA (US); Hemanth Sampath, San Diego, CA (US); Sameer Vermani, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/183,703

(22) Filed: Jun. 15, 2016

(65) Prior Publication Data

US 2016/0294530 A1 Oct. 6, 2016

Related U.S. Application Data

(62) Division of application No. 14/469,451, filed on Aug. 26, 2014, now Pat. No. 9,860,174.

(Continued)

(51) Int. Cl.
*H04L 12/911* (2013.01)
*H04L 12/927* (2013.01)
(Continued)

(52) U.S. Cl.
CPC ........... *H04L 47/12* (2013.01); *H04B 7/0452* (2013.01); *H04B 7/2621* (2013.01);
(Continued)

(58) Field of Classification Search
CPC ........... H04W 72/1284; H04W 72/121; H04W 72/042; H04W 28/06; H04W 74/006;
(Continued)

(56) References Cited

U.S. PATENT DOCUMENTS 7,221,681 B2 5/2007 Choi et al.
7,352,718 B1 4/2008 Perahia et al.
(Continued)

FOREIGN PATENT DOCUMENTS

CN 101040458 A 9/2007
CN 101159644 A 4/2008
(Continued)

OTHER PUBLICATIONS

Gong M.X., et al., "Multi-User Operation in mmWave Wireless Networks", ICC 2011-2011 IEEE International Conference on Communications—Jun. 5-9, 2011—Kyoto,Japan, IEEE, Piscataway, NJ, USA, Jun. 5, 2011 (Jun. 5, 2011), pp. 1-6, XP031908919.

(Continued)

*Primary Examiner* — Un C Cho
*Assistant Examiner* — Peter K Mak
(74) *Attorney, Agent, or Firm* — Paradice and Li LLP/Qualcomm

(57) ABSTRACT

Methods and apparatus for acknowledgment of multiple user uplink are provided. In one aspect, a method of wireless communication includes receiving a first wireless message from a first station at least partially concurrently with receiving a second wireless message from a second station, generating a first acknowledgment message in response to receiving the first wireless message, generating a second acknowledgement message in response to receiving the second wireless message, and transmitting the first acknowledgment message to the first station at least partially concurrently with transmitting the second acknowledgement message to the second station.

19 Claims, 12 Drawing Sheets

Related U.S. Application Data

(60) Provisional application No. 61/871,269, filed on Aug. 28, 2013.

(51) Int. Cl.

| | |
|---|---|
| ***H04W 72/12*** | (2009.01) |
| ***H04W 74/00*** | (2009.01) |
| ***H04L 5/00*** | (2006.01) |
| ***H04W 52/50*** | (2009.01) |
| ***H04B 7/0452*** | (2017.01) |
| ***H04L 12/801*** | (2013.01) |
| ***H04N 7/173*** | (2011.01) |
| ***H04L 1/18*** | (2006.01) |
| ***H04W 74/04*** | (2009.01) |
| ***H04L 1/00*** | (2006.01) |
| ***H04L 12/851*** | (2013.01) |
| ***H04B 7/26*** | (2006.01) |
| ***H04W 72/04*** | (2009.01) |
| ***H04W 52/14*** | (2009.01) |
| ***H04W 74/08*** | (2009.01) |
| *H04L 1/16* | (2006.01) |
| *H04W 28/24* | (2009.01) |
| *H04W 28/06* | (2009.01) |

(52) U.S. Cl.

CPC .......... *H04L 1/0031* (2013.01); *H04L 1/1854* (2013.01); *H04L 1/1858* (2013.01); *H04L 1/1861* (2013.01); *H04L 5/003* (2013.01); *H04L 5/0005* (2013.01); *H04L 5/0007* (2013.01); *H04L 5/0037* (2013.01); *H04L 5/0055* (2013.01); *H04L 47/14* (2013.01); *H04L 47/24* (2013.01); *H04L 47/72* (2013.01); *H04L 47/805* (2013.01); *H04N 7/17309* (2013.01); *H04W 52/146* (2013.01); *H04W 72/042* (2013.01); *H04W 72/0413* (2013.01); *H04W 72/0446* (2013.01); *H04W 72/0453* (2013.01); *H04W 72/12* (2013.01); *H04W 72/1284* (2013.01); *H04W 72/1289* (2013.01); *H04W 74/006* (2013.01); *H04W 74/008* (2013.01); *H04W 74/04* (2013.01); *H04W 74/08* (2013.01); *H04L 1/0008* (2013.01); *H04L 1/1607* (2013.01); *H04L 5/0044* (2013.01); *H04L 2001/0093* (2013.01); *H04W 28/06* (2013.01); *H04W 28/24* (2013.01); *H04W 52/50* (2013.01); *H04W 72/121* (2013.01); *H04W 74/085* (2013.01)

(58) Field of Classification Search

CPC ... H04W 74/04; H04W 74/008; H04W 28/24; H04W 72/0446; H04W 52/146; H04W 72/0453; H04W 72/12; H04W 74/085; H04W 72/0413; H04W 74/08; H04W 72/1289; H04L 1/1861; H04L 5/0007; H04L 1/1858; H04L 5/0055; H04L 47/12; H04L 2001/0093; H04L 1/1854; H04L 1/1607; H04L 5/003; H04L 5/0037; H04L 5/0005; H04L 47/24; H04L 47/14; H04B 7/0452; H04B 7/2621

See application file for complete search history.

(56) References Cited

U.S. PATENT DOCUMENTS 7,376,122 B2 5/2008 Draves et al.
7,995,583 B2 8/2011 Del et al.
8,081,658 B2 12/2011 Zuniga et al.
8,306,010 B2 11/2012 Gong et al.
8,434,336 B2 5/2013 Abraham et al.
8,472,383 B1 6/2013 Banerjea et al.
8,571,010 B1 10/2013 Zhang et al.
8,867,329 B2 10/2014 Hui et al.
8,976,741 B2 3/2015 Wentink
9,113,478 B2 8/2015 Wentink
9,137,815 B2 9/2015 Sampath et al.
9,253,767 B2 2/2016 Wang et al.
9,438,384 B2 9/2016 Wentink
9,578,654 B2 2/2017 Das et al.
2002/0105970 A1 8/2002 Shvodian
2005/0195784 A1 9/2005 Freedman et al.
2005/0237992 A1* 10/2005 Mishra ................ H04L 12/2854 370/349
2006/0084460 A1 4/2006 Matsuo et al.
2006/0195753 A1* 8/2006 Nam .................... H04L 1/1614 714/749
2007/0058605 A1 3/2007 Meylan et al.
2007/0110055 A1* 5/2007 Fischer .................. H04L 47/10 370/389
2007/0159982 A1 7/2007 Singh et al.
2007/0217443 A1* 9/2007 Sakoda .............. H04W 74/002 370/463
2007/0230493 A1 10/2007 Dravida et al.
2008/0037570 A1 2/2008 Kim et al.
2008/0151831 A1 6/2008 Khan et al.
2008/0273488 A1 11/2008 Shaheen
2009/0040970 A1 2/2009 Ahmadi et al.
2009/0067358 A1 3/2009 Fischer
2009/0116434 A1 5/2009 Lohr et al.
2009/0147768 A1 6/2009 Ji et al.
2010/0008318 A1* 1/2010 Wentink ............. H04W 74/006 370/329
2010/0014474 A1 1/2010 Miki et al.
2010/0046457 A1 2/2010 Abraham et al.
2010/0087149 A1 4/2010 Srinivasan et al.
2010/0260138 A1 10/2010 Liu et al.
2010/0271992 A1 10/2010 Wentink et al.
2010/0284393 A1 11/2010 Abraham et al.
2010/0298016 A1 11/2010 Madan et al.
2010/0315999 A1 12/2010 Kakani et al.
2011/0075759 A1 3/2011 Seok
2011/0090855 A1 4/2011 Kim
2011/0116435 A1 5/2011 Liu et al.
2011/0116487 A1 5/2011 Grandhi
2011/0122780 A1 5/2011 Nieminen et al.
2011/0134816 A1* 6/2011 Liu .......................... H04L 1/06 370/310
2011/0134900 A1 6/2011 Liu et al.
2011/0141892 A1 6/2011 Gong et al.
2011/0141969 A1 6/2011 Sridhara et al.
2011/0150004 A1 6/2011 Denteneer et al.
2011/0154144 A1* 6/2011 Nanda ................. H04B 7/0417 714/748
2011/0205968 A1 8/2011 Kim et al.
2011/0205997 A1 8/2011 Chun et al.
2011/0222408 A1 9/2011 Kasslin et al.
2011/0222499 A1 9/2011 Park et al.
2011/0261708 A1 10/2011 Grandhi
2011/0268054 A1 11/2011 Abraham et al.
2011/0286402 A1 11/2011 Gong et al.
2011/0305205 A1 12/2011 Gong et al.
2011/0305209 A1 12/2011 Merlin et al.
2012/0026928 A1 2/2012 Gong et al.
2012/0051335 A1 3/2012 Kimura et al.
2012/0057471 A1 3/2012 Amini et al.
2012/0060075 A1 3/2012 Gong et al.
2012/0087348 A1 4/2012 Wentink
2012/0099568 A1* 4/2012 Wentink ............... H04W 74/04 370/338
2012/0117446 A1 5/2012 Taghavi et al.
2012/0124263 A1 5/2012 Zhou et al.
2012/0147804 A1 6/2012 Hedayat et al.
2012/0177018 A1 7/2012 Abraham et al.
2012/0207071 A1 8/2012 Zhu et al.
2012/0218983 A1 8/2012 Noh et al.
2012/0224540 A1 9/2012 Kwon et al.
2012/0314697 A1 12/2012 Noh et al.

(56) References Cited

U.S. PATENT DOCUMENTS

| | | | | |
|---|---|---|---|---|
| 2012/0327915 | A1 | 12/2012 | Kang et al. | |
| 2013/0023296 | A1 | 1/2013 | Kim et al. | |
| 2013/0114606 | A1 | 5/2013 | Schrum, Jr. et al. | |
| 2013/0114622 | A1 | 5/2013 | Veyseh et al. | |
| 2013/0136066 | A1 | 5/2013 | Kim et al. | |
| 2013/0170427 | A1 | 7/2013 | Gong et al. | |
| 2013/0188567 | A1 | 7/2013 | Wang et al. | |
| 2013/0286959 | A1 | 10/2013 | Lou et al. | |
| 2014/0036810 | A1 | 2/2014 | Harrison et al. | |
| 2014/0126509 | A1* | 5/2014 | You | H04B 7/04 370/329 |
| 2014/0173682 | A1 | 6/2014 | Xiao et al. | |
| 2014/0269544 | A1 | 9/2014 | Zhu et al. | |
| 2014/0334387 | A1 | 11/2014 | Doppler et al. | |
| 2014/0349663 | A1 | 11/2014 | Shu et al. | |
| 2015/0009966 | A1 | 1/2015 | Lee et al. | |
| 2015/0063111 | A1 | 3/2015 | Merlin et al. | |
| 2015/0063190 | A1 | 3/2015 | Merlin et al. | |
| 2015/0063191 | A1 | 3/2015 | Merlin et al. | |
| 2015/0063257 | A1 | 3/2015 | Merlin et al. | |
| 2015/0063258 | A1 | 3/2015 | Merlin et al. | |
| 2015/0063291 | A1 | 3/2015 | Merlin et al. | |
| 2015/0063318 | A1 | 3/2015 | Merlin et al. | |
| 2015/0063320 | A1 | 3/2015 | Merlin et al. | |
| 2016/0014804 | A1 | 1/2016 | Merlin et al. | |
| 2016/0021678 | A1 | 1/2016 | Merlin et al. | |
| 2016/0142122 | A1 | 5/2016 | Merlin et al. | |
| 2016/0302229 | A1 | 10/2016 | Hedayat et al. | |
| 2017/0214504 | A1 | 7/2017 | Merlin et al. | |
| 2018/0048573 | A1 | 2/2018 | Merlin et al. | |
| 2018/0048574 | A1 | 2/2018 | Merlin et al. | |
| 2018/0167324 | A1 | 6/2018 | Merlin et al. | |
| 2019/0173794 | A1 | 6/2019 | Merlin et al. | |

FOREIGN PATENT DOCUMENTS

| | | | |
|---|---|---|---|
| CN | 101536391 | A | 9/2009 |
| CN | 101742604 | A | 6/2010 |
| CN | 101742667 | A | 6/2010 |
| CN | 101796880 | A | 8/2010 |
| CN | 102047699 | A | 5/2011 |
| CN | 102158320 | A | 8/2011 |
| CN | 102202414 | A | 9/2011 |
| CN | 102237920 | A | 11/2011 |
| CN | 102281132 | A | 12/2011 |
| CN | 102739375 | A | 10/2012 |
| CN | 102845101 | A | 12/2012 |
| CN | 103081373 | A | 5/2013 |
| CN | 103120008 | A | 5/2013 |
| CN | 103209468 | A | 7/2013 |
| EP | 1589704 | A2 | 10/2005 |
| EP | 1589784 | A2 | 10/2005 |
| EP | 2139165 | A1 | 12/2009 |
| EP | 2429250 | A1 | 3/2012 |
| JP | 2007329694 | A | 12/2007 |
| JP | 2009246480 | A | 10/2009 |
| JP | 2010045784 | A | 2/2010 |
| JP | 2010263490 | A | 11/2010 |
| JP | 2010263491 | A | 11/2010 |
| JP | 2010263493 | A | 11/2010 |
| JP | 2010538514 | A | 12/2010 |
| JP | 2011109205 | A | 6/2011 |
| JP | 2011234356 | A | 11/2011 |
| JP | 2012511860 | A | 5/2012 |
| JP | 2012521137 | A | 9/2012 |
| JP | 2013070157 | A | 4/2013 |
| JP | 2013135426 | A | 7/2013 |
| JP | 2014511629 | A | 5/2014 |
| KR | 20110058709 | A | 6/2011 |
| KR | 20120100127 | A | 9/2012 |
| RU | 2249916 | C2 | 4/2005 |
| RU | 2007116968 | A | 11/2008 |
| WO | WO-2006041891 | A2 | 4/2006 |
| WO | WO-2008100242 | A2 | 8/2008 |
| WO | WO-2008155624 | A2 | 12/2008 |
| WO | WO-2010099496 | A1 | 9/2010 |
| WO | WO-2010128621 | A1 | 11/2010 |
| WO | WO-2010129239 | A1 | 11/2010 |
| WO | WO-2010142849 | A1 | 12/2010 |
| WO | WO-2011060309 | A1 | 5/2011 |
| WO | WO-2012118258 | A1 | 9/2012 |
| WO | WO-2012119127 | A1 | 9/2012 |
| WO | WO-2012122179 | A1 | 9/2012 |
| WO | WO-2013130793 | A1 | 9/2013 |
| WO | WO-2015166959 | A1 | 11/2015 |
| WO | WO-2016007770 | A1 | 1/2016 |

OTHER PUBLICATIONS

IEEE Standard for Information technology—Telecommunications and information exchange between systems—Local and metropolitan area networks—Specific requirements—Part 11: Wireless LAN Medium Access Control (MAC) and Physical Layer (PHY) Specifications/Part 11, IEEE Std 802.11;-2007 (Revision of IEEE Std 802.11-1999) http://standards.ieee.org/getieee802/download/802.11-2007.pdf. (Date Obtained from Internet Oct. 21, 2009) Jun. 12, 2007, pp. 251-312; XP002555935.

International Search Report and Written Opinion—PCT/US2014/052844—ISA/EPO—dated Dec. 4, 2014.

Nee R.V., et al., "UL MU-MIMO for 11ac", IEEE 802.11-09/0852-00-00ac, Jul. 15, 2009, pp. 1-10, URL: https://mentor.ieee.org/802.11/dcn/09/11-09/0852-00-00ac-ul-mu-mimo-for-11ac.pptx.

Ahn W., et al., "UL-OFDMA Procedure in IEEE 802.11ax", IEEE 802.11-15/0091r1, Jan. 14, 2015, Internet URL:https://Mentor.ieee.org/802.11/dcn/15/11-15-0091-01-00ax-ul-ofdma-procedure-In-ieee-802-11ax.pptx.

Ahn W., "Multi Channel Availability for UL-OFDMA", IEEE 802.11-15/0612r0,IEEE Draft; 11-15-0612-00-00AX-Multi-Channel-Availabilityfor-UL-OFDMA, IEEE-SA Mentor, Piscataway, NJ, USA, vol. 802.11 ax, May 11, 2015 (issued May 11, 2015), XP068094484, pp. 1-16, Internet URL:https://Mentor.ieee.org/802.11/dcn/15/11-15-0612-00-00ax-multi-channel-Availability-for-ul-ofdma.pptx.

"IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput; IEEE Std 802.11n-2009 (Amendment to IEEE Std 802.11-2007)", IEEE Standard, IEEE, Piscataway, NJ, USA, issued Oct. 29, 2009 (Oct. 29, 2019) , pp. 1-565, XP017694836, ISBN: 978-0/7381-6046-7.

Nguyen T T., et al., "Submission doc.: IEEE 11-14/0598r0 Uplink multi-user MAC protocol for 11ax", XP055211882, May 11, 2014, 19 Pages. Retrieved from the Internet: URL:https://mentor.ieee.org/802.11/dcn/14/11-14-0598-00-00ax-uplink-multi-user-mac-protocol-for-11ax.pptx [retrieved on Sep. 8, 2015].

* cited by examiner

METHODS AND APPARATUS FOR ACKNOWLEDGMENT OF MULTI-USER UPLINK WIRELESS TRANSMISSIONS

CROSS-REFERENCE TO RELATED APPLICATIONS

This application is a divisional application of co-pending U.S. patent application Ser. No. 14/469,451 filed Aug. 26, 2014, and entitled "METHODS AND APPARATUS FOR MULTIPLE USER UPLINK," which claims priority to U.S. Provisional Application No. 61/871,269 filed Aug. 28, 2013, and entitled "METHODS AND APPARATUS FOR MULTIPLE USER UPLINK." The contents of the prior applications are considered part of this application, and are hereby incorporated by reference in their entireties.

FIELD

Certain aspects of the present disclosure generally relate to wireless communications, and more particularly, to methods and apparatus for multiple user uplink communication in a wireless network.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions. Thus, there is a need for an improved protocol for uplink transmissions from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect disclosed is a method of wireless communication. The method includes receiving a first wireless message from a first station at least partially concurrently with receiving a second wireless message from a second station, generating a first acknowledgment message in response to receiving the first wireless message, generating a second acknowledgement message in response to receiving the second wireless message; and transmitting the first acknowledgment message to the first station at least partially concurrently with transmitting the second acknowledgement message to the second station.

In some aspects, the first acknowledgment message is a block acknowledgment and the second acknowledgment message is an acknowledgment of a single frame. In some aspects, the method further includes receiving a third wireless message from the first station, the third wireless message indicating an acknowledgment policy for the first station; and transmitting the first acknowledgment message based on the acknowledgment policy for the first station. In some aspects, the method also includes determining the first wireless station requests immediate block acknowledgements based on the third wireless message; and transmitting the first acknowledgment message based on the determining.

In some aspects, the method also includes receiving a third wireless message from a third station at least partially concurrently with the first wireless message and the second wireless message, receiving a fourth wireless message from the third station indicating the third station requests delayed block acknowledgments; and transmitting a third acknowledgment message to the third station after completion of the transmissions of the first and second wireless messages based on the fourth wireless message.

In some aspects, the method also includes receiving the first wireless message over a first spatial stream, receiving the second wireless message over a second spatial stream, determining a third spatial stream based on the first spatial stream, determining a fourth spatial stream based on the second spatial stream, transmitting the first acknowledgment message over the third spatial stream, and transmitting the second acknowledgment message over the fourth spatial stream.

In some aspects, the method also includes receiving the first wireless message over a first frequency, receiving the second wireless message over a second frequency, determining a third frequency based on the first frequency, determining a fourth frequency based on the second frequency; and transmitting the first acknowledgment message over the third frequency; and transmitting the second acknowledgment message over the fourth frequency.

In some aspects, the method also includes generating a clear to transmit message, the clear to transmit message indicating a third station has permission to transmit a third wireless message, the clear to transmit message further indicating a time when an acknowledgment for the third wireless message will be transmitted; and transmitting the clear to transmit message to the third station; and transmitting an acknowledgment to the third wireless message at the indicated time.

Another aspect disclosed is an apparatus for wireless communication. The apparatus includes a receiver configured to receive a first wireless message from a first station at least partially concurrently with receiving a second wireless message from a second station, a processor configured to generate a first acknowledgment message in response to receiving the first wireless message, and generate a second acknowledgement message in response to receiving the second wireless message; and a transmitter configured to transmit the first acknowledgment message to the first station at least partially concurrently with transmitting the second acknowledgement message to the second station.

In some aspects, the apparatus also includes receive a third wireless message from the first station, the third wireless message indicating an acknowledgment policy for the first station; and transmitting the first acknowledgment message based on the acknowledgment policy for the first station. In some aspects of the apparatus the processor is further configured to determine the first wireless station requests immediate block acknowledgements based on the third wireless message, and the transmitter is further configured to transmit the first acknowledgment message based on the determining.

In some aspects of the apparatus, the receiver is further configured to receive a third wireless message from a third station at least partially concurrently with the first wireless message and the second wireless message, receive a fourth wireless message from the third station indicating the third station requests delayed block acknowledgments; and the transmitter is further configured to transmit a third acknowledgment message to the third station after completion of the transmissions of the first and second wireless messages based on the fourth wireless message.

In some aspects of the apparatus, the receiver is further configured to receive the first wireless message over a first spatial stream and receive the second wireless message over a second spatial stream, and wherein the processor is further configured to determine a third frequency based on the first spatial stream and determine a fourth frequency based on the second spatial stream; and the transmitter is further configured to transmit the first acknowledgment message over the third spatial stream and transmit the second acknowledgment message over the fourth spatial stream.

In some aspects of the apparatus, the receiver is further configured to receive the first wireless message over a first frequency and receive the second wireless message over a second frequency, and wherein the processor is further configured to determine a third frequency based on the first frequency and determine a fourth frequency based on the second frequency; and the transmitter is further configured to transmit the first acknowledgment message over the third frequency and transmit the second acknowledgment message over the fourth frequency.

In some aspects of the apparatus, the processor is further configured to generate a clear to transmit message, the clear to transmit message indicating a third station has permission to transmit a third wireless message, the clear to transmit message further indicating a time when an acknowledgment for the third wireless message will be transmitted; and the transmitter is further configured to transmit the clear to transmit message to the third station; and transmit an acknowledgment to the third wireless message at the indicated time.

Another aspect disclosed is a method of wireless communication. The method includes transmitting, via a first wireless device, a first wireless message to a second wireless device at least partially concurrently with a transmission by a third wireless device of a second wireless message to the second wireless device; and receiving an acknowledgment message for the first wireless message at least partially concurrently with receiving at least a portion of a second acknowledgment message for the second wireless message.

In some aspects, the method further includes generating a third wireless message, the wireless message indicating an acknowledgment policy for acknowledging the first wireless message; and transmitting the third wireless message to the second wireless device.

Some aspects of the method further include generating the third wireless message to indicate an acknowledgment policy of immediate block acknowledgment or acknowledgment of a single frame. In some aspects, the method further includes receiving a clear to transmit message from the second wireless device, decoding the clear to transmit message to determine a time to transmit the first wireless message; and transmitting the first wireless message at the determined time.

Some aspects of the method include transmitting, via the first wireless device, an acknowledgment policy message indicating delayed block acknowledgments are requested, transmitting, via the first wireless device, a third wireless message to the second wireless device at least partially currently with a transmission by a fourth wireless device of a fourth wireless message transmitted to the second wireless device; and transmitting a block acknowledgment request message to the second wireless device, the block acknowledgment request message requesting acknowledgment of the third wireless message; and receiving a block acknowledgment message for the third wireless message from the second wireless device.

Some aspects of the method also include receiving the acknowledgment for the first wireless message over a first spatial stream and receiving the second acknowledgment message over a second spatial stream. In some aspects, the method also includes receiving the acknowledgment for the first acknowledgment message over a first frequency and receiving the second acknowledgment message over a second frequency.

Another aspect disclosed is an apparatus for wireless communication. The apparatus includes a transmitter configured to transmit a first wireless message to a second wireless device at least partially concurrently with a transmission by a third wireless device of a second wireless message to the second wireless device; and a receiver configured to receive an acknowledgment message for the first wireless message at least partially concurrently with receiving at least a portion of a second acknowledgment message for the second wireless message.

In some aspects, the apparatus also includes a processor configured to generate a third wireless message, the wireless message indicating an acknowledgment policy for acknowledging the first wireless message, wherein the transmitter is further configured to transmit the third wireless message to the second wireless device. In some aspects of the apparatus, the processor is further configured to generate the third wireless message to indicate an acknowledgment policy of immediate block acknowledgment or acknowledgment of a single frame.

In some aspects of the apparatus, the receiver is further configured to receive a clear to transmit message from the second wireless device, and wherein the processor is further configured to decode the clear to transmit message to determine a time to transmit the first wireless message, and the transmitter is further configured to transmit the first wireless message at the determined time.

In some aspects of the apparatus, the transmitter is further configured to transmit an acknowledgment policy message indicating delayed block acknowledgments are requested, transmit a third wireless message to the second wireless device at least partially currently with a transmission by a fourth wireless device of a fourth wireless message transmitted to the second wireless device, transmit a block acknowledgment request message to the second wireless device, the block acknowledgment request message requesting acknowledgment of the third wireless message, and the receiver is further configured to receive a block acknowledgment message for the third wireless message from the second wireless device.

In some aspects of the apparatus, the receiver is further configured to receive the acknowledgment for the first wireless message over a first spatial stream and receive the second acknowledgment message over a second spatial stream. In some aspects of the apparatus, the receiver is further configured to receive the acknowledgment for the first acknowledgment message over a first frequency and receive the second acknowledgment message over a second frequency.

DETAILED DESCRIPTION

Figure 1:
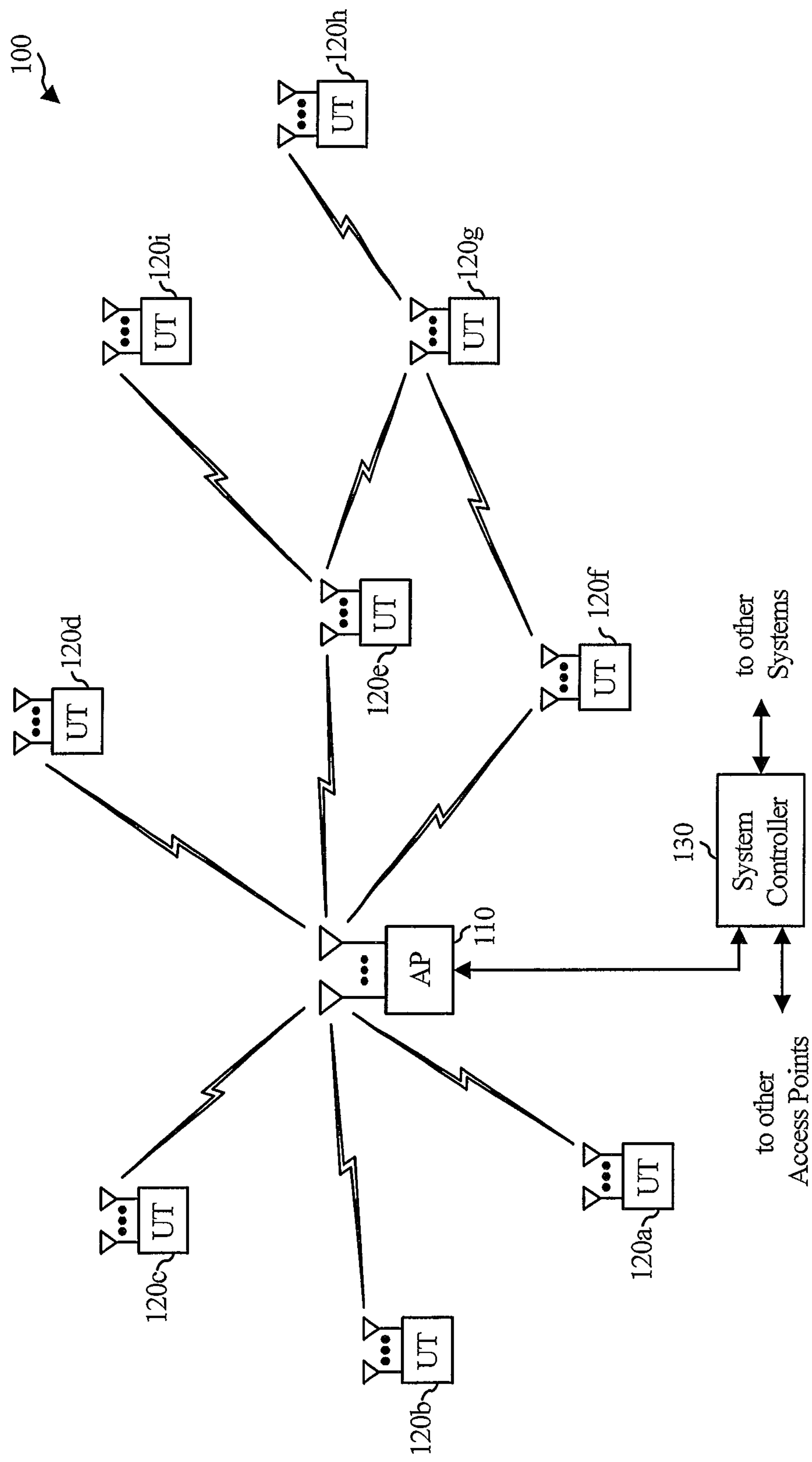
FIG. 1 illustrates a multiple-access multiple-input multiple-output (MIMO) system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \leq K \leq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
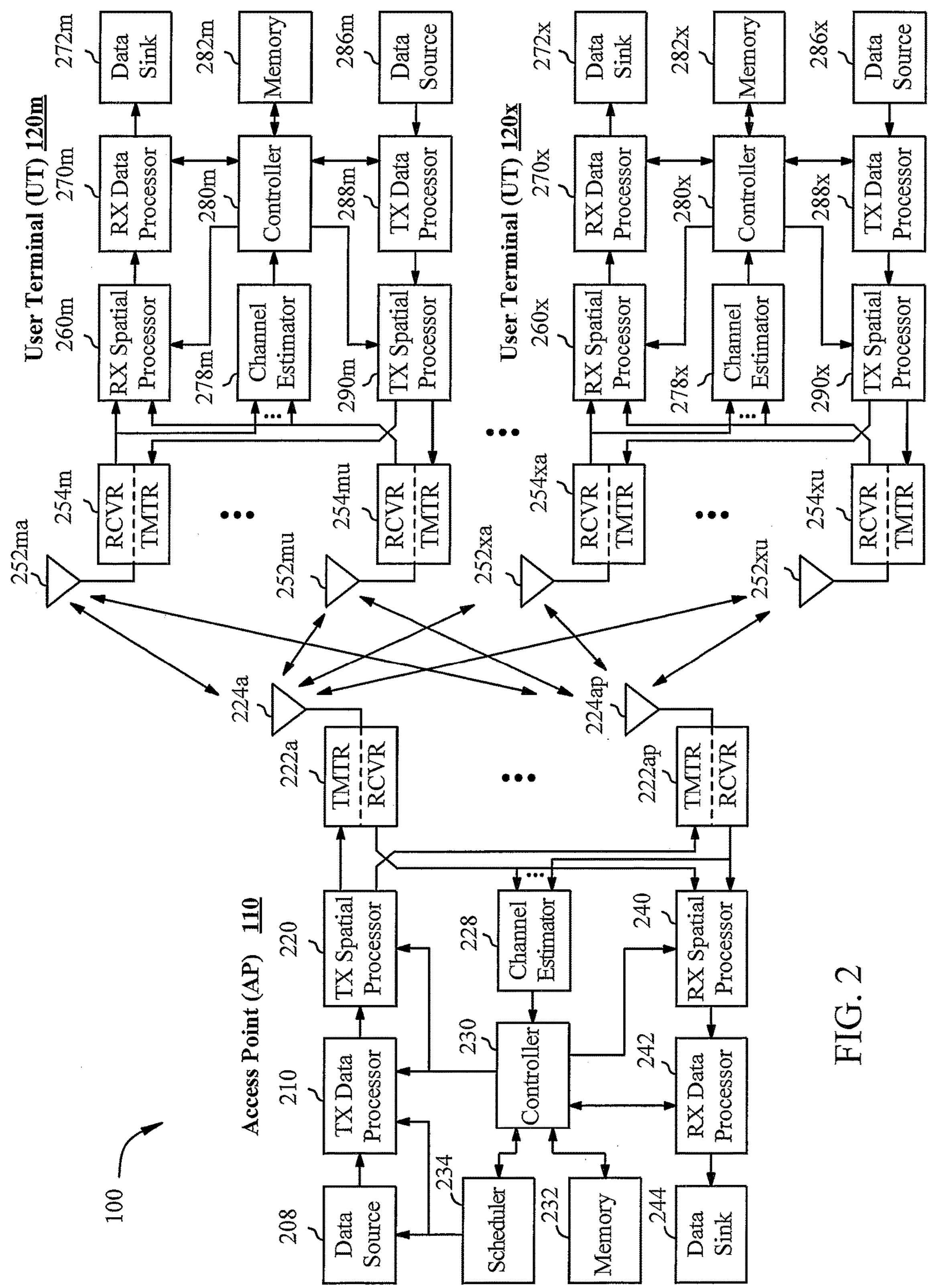
FIG. 2 illustrates a block diagram of the access point and two user terminals in a MIMO system.

FIG. 2 illustrates a block diagram of the access point 110 and two user terminals 120_m_ and 120_x_ in MIMO system 100. The access point 110 is equipped with $N_t$ antennas 224_a_ through 224_ap_. The user terminal 120_m_ is equipped with $N_{ut,m}$ antennas $\mathbf{252}_{ma}$ through $\mathbf{252}_{mu}$, and the user terminal 120_x_ is equipped with $N_{ut,x}$ antennas $\mathbf{252}_{xa}$ through $\mathbf{252}_{xu}$.

The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224*a* through 224$_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
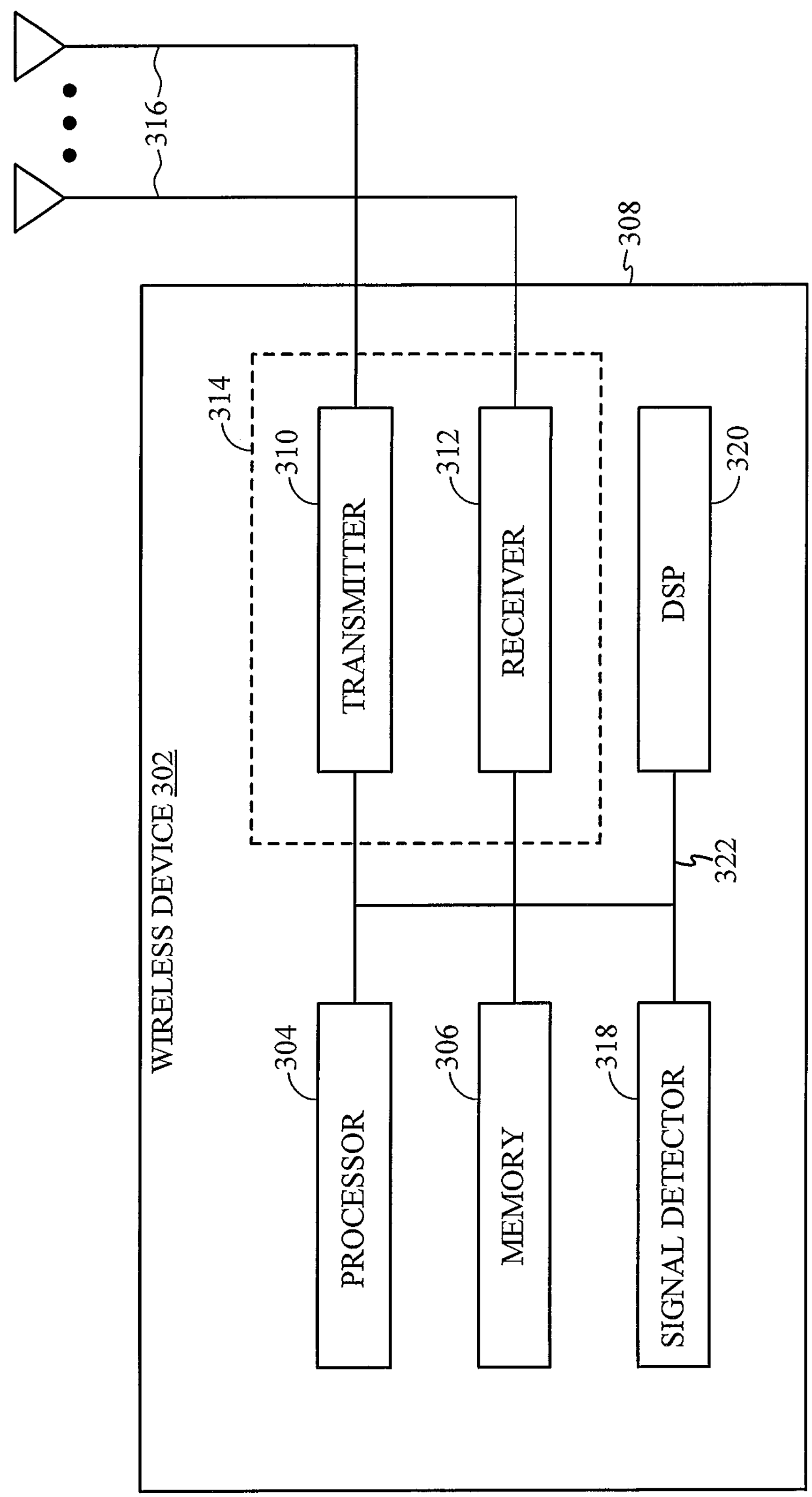
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support transmitting an uplink (UL) signal from multiple STAs to an AP. In some embodiments, the UL signal may be transmitted in a multi-user MIMO (MU-MIMO) system. Alternatively, the UL signal may be transmitted in a multi-user FDMA (MU-FDMA) or similar FDMA system. Specifically, FIGS. 4-7 illustrate UL-MU-MIMO transmissions 410A, 410B, that would apply equally to UL-FDMA transmissions. In these embodiments, UL-MU-MIMO or UL-FDMA transmissions can be sent simultaneously from multiple STAs to an AP and may create efficiencies in wireless communication.

Figure 4:
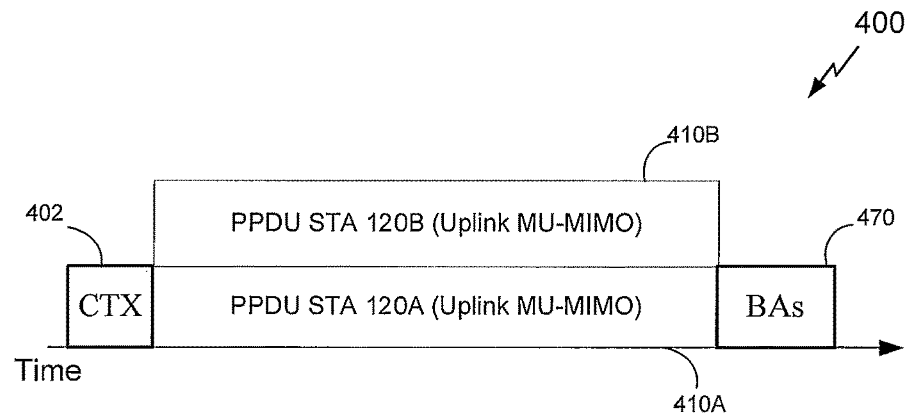
FIG. 4 shows a time diagram of an example frame exchange of an uplink (UL) MU-MIMO communication.

FIG. 4 is a time sequence diagram illustrating an example of an UL-MU-MIMO protocol 400 that may be used for UL communications. As shown in FIG. 4 and in conjunction with FIG. 1, an AP 110 may transmit a clear to transmit (CTX) message 402 to the user terminals 120 indicating which STAs may participate in the UL-MU-MIMO scheme, such that a particular STA knows to start an UL-MU-MIMO. An example of a CTX frame structure is described more fully below with reference to FIG. 10.

Once a user terminal 120 receives a CTX message 402 from the AP 110 where the user terminal is listed, the user terminal may transmit the UL-MU-MIMO transmission 410. In FIG. 4, STA 120A and STA 120B transmit UL-MU-MIMO transmission 410A and 410B containing physical layer convergence protocol (PLCP) protocol data units (PPDUs). Upon receiving the UL-MU-MIMO transmission 410, the AP 110 may transmit block acknowledgments (BAs) 470 to the user terminals 120.

Not all APs or user terminals 120 may support UL-MU-MIMO or UL-FDMA operation. A capability indication from a user terminal 120 may be indicated in a high efficiency wireless (HEW) capability element that is included in an association request or probe request and may include a bit indicating capability, the maximum number of spatial streams a user terminal 120 can use in a UL-MU-MIMO transmission, the frequencies a user terminal 120 can use in a UL-FDMA transmission, the minimum and maximum power and granularity in the power backoff, and the minimum and maximum time adjustment a user terminal 120 can perform.

A capability indication from an AP may be indicated in a HEW capability element that is included in an association response, beacon or probe response and may include a bit indicating capability, the maximum number of spatial streams a single user terminal 120 can use in a UL-MU-MIMO transmission, the frequencies a single user terminal 120 can use in a UL-FDMA transmission, the required power control granularity, and the required minimum and maximum time adjustment a user terminal 120 should be able to perform.

In one embodiment, capable user terminals 120 may request to a capable AP to be part of the UL-MU-MIMO (or UL-FDMA) protocol by sending a management frame to AP indicating request for enablement of the use of UL-MU-MIMO feature. In one aspect, an AP 110 may respond by granting the use of the UL-MU-MIMO feature or denying it. Once the use of the UL-MU-MIMO is granted, the user terminal 120 may expect a CTX message 402 at a variety of times. Additionally, once a user terminal 120 is enabled to operate the UL-MU-MIMO feature, the user terminal 120 may be subject to follow a certain operation mode. If multiple operation modes are possible, an AP may indicate to the user terminal 120 which mode to use in a HEW capability element or in an operation element. In one aspect the user terminals 120 can change the operation modes and parameters dynamically during operation by sending a different operating element to the AP 110. In another aspect the AP 110 may switch operation modes dynamically during operation by sending an updated operating element to a user terminal 120 or in a beacon. In another aspect, the operation modes may be indicated in the setup phase and may be setup per user terminal 120 or for a group of user terminals 120. In another aspect the operation mode may be specified per traffic identifier (TID).

Figure 5:
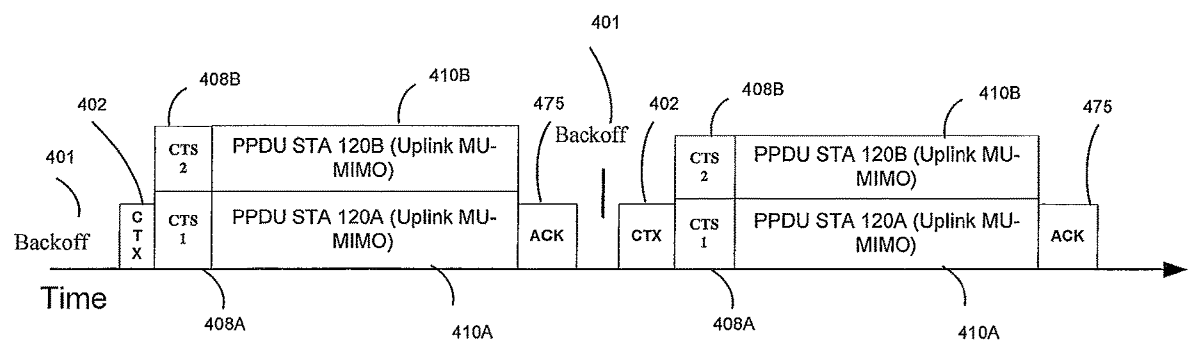
FIG. 5 shows a time diagram of another example frame exchange of an UL-MU-MIMO communication.

FIG. 5 is a time sequence diagram that, in conjunction with FIG. 1, illustrates an example of an operation mode of a UL-MU-MIMO transmission. In this embodiment, a user terminal 120 receives a CTX message 402 from an AP 110 and sends an immediate response to the AP 110. The response may be in the form of a clear to send (CTS) 408 or another similar signal. In one aspect, requirement to send a CTS may be indicated in the CTX message 402 or may be indicated in the setup phase of the communication. As shown in FIG. 5, STA 120 A and STA 120B may transmit a CTS 1 408A and CTS 2 408B message in response to receiving the CTX message 402. The modulation and coding scheme (MCS) of the CTS 1 408A and CTS 2 408B may be based on the MCS of the CTX message 402. In this embodiment, CTS 1 408A and CTS 2 408B contain the same bits and the same scrambling sequence so that they may be transmitted to the AP 110 at the same time. The duration field of the CTS 408 signals may be based on the duration field in the CTX by removing the time for the CTX PPDU. The UL-MU-MIMO transmission 410A and 410B are then sent by the STAs 120A and 120B as listed in the CTX 402 signals. The AP 110 may then send acknowledgment (ACK) signals the STAs 120A and 120B. In some aspects, the ACK signals may be serial ACK signals to each station or BAs. In some aspects the ACKs may be polled. This embodiment creates efficiencies by simultaneously transmitting CTS 408 signals from multiple STAs to an AP 110 instead of sequentially, which saves time and reduces the possibility of interference.

Figure 6:
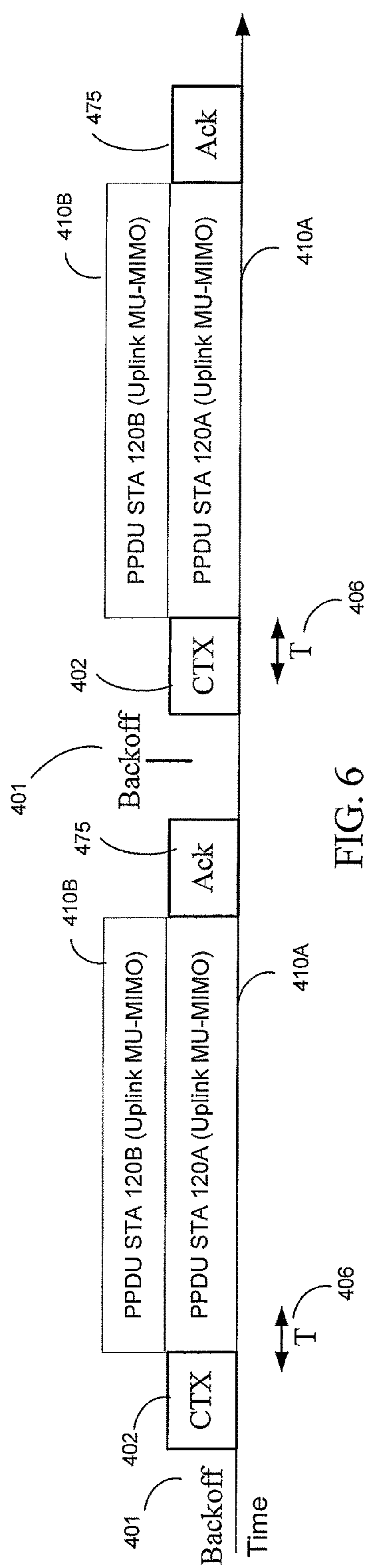
FIG. 6 shows a time diagram of another example frame exchange of an UL-MU-MIMO communication.

FIG. 6 is a time sequence diagram that, in conjunction with FIG. 1, illustrates another example of an operation mode of a UL-MU-MIMO transmission. In this embodiment, user terminals 120A and 120B receive a CTX message 402 from an AP 110 and are allowed to start and UL-MU-MIMO transmission a time (T) 406 after the end of the PPDU carrying the CTX message 402. The T 406 may be a short interframe space (SIFS), point interframe space (PIFS), or another time potentially adjusted with additional offsets as indicated by an AP 110 in the CTX message 402 or via a management frame. The SIFS and PIFS time may be fixed in a standard or indicated by an AP 110 in the CTX message 402 or in a management frame. The benefit of T 406 may be to improve synchronization or to allow user terminals 120A and 120B time to process the CTX message 402 or other messages before transmission.

Referring to FIGS. 4-6, in conjunction with FIG. 1, the UL-MU-MIMO transmission 410 may have the same duration. The duration of the UL-MU-MIMO transmission 410 for user terminals utilizing the UL-MU-MIMO feature may be indicated in the CTX message 402 or during the setup phase. To generate a PPDU of the required duration, a user terminal 120 may build a PLCP service data unit (PSDU) so that the length of the PPDU matches the length indicated in the CTX message 402. In another aspect, a user terminal 120 may adjust the level of data aggregation in a media access control (MAC) protocol data unit (A-MPDU) or the level of data aggregation in a MAC service data units (A-MSDU) to approach the target length. In another aspect, a user terminal 120 may add end of file (EOF) padding delimiters to reach the target length. In another approach the padding or the EOF pad fields are added at the beginning of the A-MPDU. One of the benefits of having all the UL-MU-MIMO transmissions the same length is that the power level of the transmission will remain constant.

In some embodiments, a user terminal 120 may have data to upload to the AP but the user terminal 120 has not received a CTX message 402 or other signal indicating that the user terminal 120 may start a UL-MU-MIMO transmission.

Figure 7:
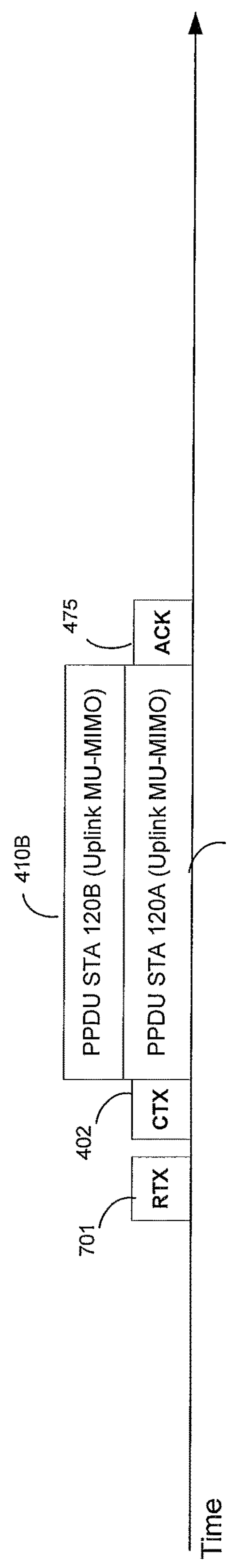
FIG. 7 shows a time diagram of another example frame exchange of an UL-MU-MIMO communication.

In one operation mode, the user terminals 120 may not transmit outside an UL-MU-MIMO transmission opportunity (TXOP) (e.g., after CTX message 402). In another operation mode, user terminals 120 may transmit frames to initialize a UL-MU-MIMO transmission, and then may transmit during the UL-MU-MIMO TXOP, if for example, they are instructed to do so in a CTX message 402. In one embodiment, the frame to initialize a UL-MU-MIMO transmission may be a request to transmit (RTX), a frame specifically designed for this purpose (an example of a RTX frame structure is described more fully below with reference to FIG. 9). The RTX frames may be the only frames a user terminal 120 is allowed to use to initiate a UL MU MIMO TXOP. In one embodiment, the user terminal may not transmit outside an UL-MU-MIMO TXOP other than by sending an RTX. In another embodiment, a frame to initialize an UL MU MIMO transmission may be any frame which indicates to an AP 110 that a user terminal 120 has data to send. It may be pre-negotiated that these frames indicate a UL MU MIMO TXOP request. For example, the following may be used to indicate that a user terminal 120 has data to send and is requesting an UL MU MIMO TXOP: an RTS, a data frame or QoS Null frame with bits 8-15 of the QoS control frame set to indicate more data, or a PS poll. In one embodiment, the user terminal may not transmit outside an UL MU MIMO TXOP other than by sending frames to trigger this TXOP, where this frame may be an RTS, PS poll, or QOS null. In another embodiment, the user terminal may send single user uplink data as usual, and may indicate a request for a UL MU MIMO TXOP by setting bits in the QoS control frame of its data packet. FIG. 7 is a time sequence diagram illustrating, in conjunction with FIG. 1, an example where the frame to initialize a UL-MU-MIMO is a RTX 701. In this embodiment the user terminal 120 sends to the AP 110 a RTX 701 that includes information regarding the UL-MU-MIMO transmission. As shown in FIG. 7, the AP 110 may respond to the RTX 701 with a CTX message 402 granting an UL-MU-MIMO TXOP to send the UL-MU-MIMO transmission 410 immediately following the CTX message 402. In another aspect, the AP 110 may respond with a CTS that grants a single-user (SU) UL TXOP. In another aspect, the AP 110 may respond with a frame (e.g., ACK or CTX with a special indication) that acknowledges the reception of the RTX 701 but does not grant an immediate UL-MU-MIMO TXOP. In another aspect, the AP 110 may respond with a frame that acknowledges the reception of the RTX 701, does not grant an immediate UL-MU-MIMO TXOP, but grants a delayed UL-MU-MIMO TXOP and may identify the time of the TXOP is granted. In this embodiment, the AP 110 may send a CTX message 402 to start the UL-MU-MIMO at the granted time.

In another aspect, the AP 110 may respond to the RTX 701 with an ACK or other response signal which does not grant the user terminal 120 an UL-MU-MIMO transmission but indicates that the user terminal 120 shall wait for a time (T) before attempting another transmission (e.g., sending another RTX). In this aspect the time (T) may be indicated by the AP 110 in the setup phase or in the response signal. In another aspect an AP 110 and a user terminal 120 may agree on a time which the user terminal 120 may transmit a RTX 701, RTS, PS-poll, or any other request for a UL-MU-MIMO TXOP.

In another operation mode, user terminals 120 may transmit requests for UL-MU-MIMO transmissions 410 in accordance with regular contention protocol. In another aspect, the contention parameters for user terminals 120 using UL-MU-MIMO are set to a different value than for other user terminals that are not using the UL-MU-MIMO feature. In this embodiment, the AP 110 may indicate the value of the contention parameters in a beacon, association response or through a management frame. In another aspect, the AP 110 may provide a delay timer that prevents a user terminal 120 from transmitting for a certain amount of time after each successful UL-MU-MIMO TXOP or after each RTX, RTS, PS-poll, or QoS null frame. The timer may be restarted after each successful UL-MU-MIMO TXOP. In one aspect, the AP 110 may indicate the delay timer to user terminals 120 in the setup phase or the delay timer may be different for each user terminal 120. In another aspect, the AP 110 may indicate the delay timer in the CTX message 402 or the delay timer may be dependent on the order of the user terminals 120 in the CTX message 402, and may be different for each terminal.

In another operational mode, the AP 110 may indicate a time interval during which the user terminals 120 are allowed to transmit a UL-MU-MIMO transmission. In one aspect, the AP 110 indicates a time interval to the user terminals 120 during which the user terminals are allowed to send a RTX or RTS or other request to the AP 110 to ask for an UL-MU-MIMO transmission. In this aspect, the user terminals 120 may use regular contention protocol. In another aspect, the user terminals may not initiate a UL-MU-MIMO transmission during the time interval but the AP 110 may send a CTX or other message to the user terminals to initiate the UL-MU-MIMO transmission.

In certain embodiments, a user terminal 120 enabled for UL-MU-MIMO may indicate to an AP 110 that it requests an UL-MU-MIMO TXOP because it has data pending for UL. In one aspect, the user terminal 120 may send a RTS or a PS-poll to request a UL-MU-MIMO TXOP. In another embodiment, the user terminal 120 may send any data frame, including a quality of service (QoS) null data frame, where the bits 8-15 of the QoS control field indicate a non-empty queue. In this embodiment the user terminal 120 may determine during the setup phase which data frames (e.g., RTS, PS-poll, QoS null, etc.) will trigger a UL-MU-MIMO transmission when the bits 8-15 of the QoS control field indicate a non-empty queue. In one embodiment, the RTS, PS-poll, or QoS null frames may include a 1 bit indication allowing or disallowing the AP 110 to respond with a CTX message 402. In another embodiment, the QoS null frame may include TX power information and a per TID queue information. The TX power information and per TID queue information may be inserted in the two bytes of the sequence control and QoS controls fields in a QoS null frame and the modified QoS null frame may be sent to the AP 110 to request a UL-MU-MIMO TXOP. In another embodiment, referring to FIGS. 1 and 7, the user terminal 120 may send a RTX 701 to request a UL-MU-MIMO TXOP.

In response to receiving an RTS, RTX, PS-poll or QoS null frame, or other trigger frame as described above, an AP 110 may send a CTX message 402. In one embodiment, referring to FIG. 7, after the transmission of the CTX message 402 and the completion of the UL-MU-MIMO transmissions 410A and 410B, TXOP returns to the STAs 120A and 120B which can decide on how to use the remaining TXOP. In another embodiment, referring to FIG. 7, after the transmission of the CTX message 402 and the completion of the UL-MU-MIMO transmissions 410A and 410B, TXOP remains with the AP 110 and the AP110 may use the remaining TXOP for additional UL-MU-MIMO transmissions by sending another CTX message 402 to either STAs 120A and 120B or to other STAs.

Figure 8:
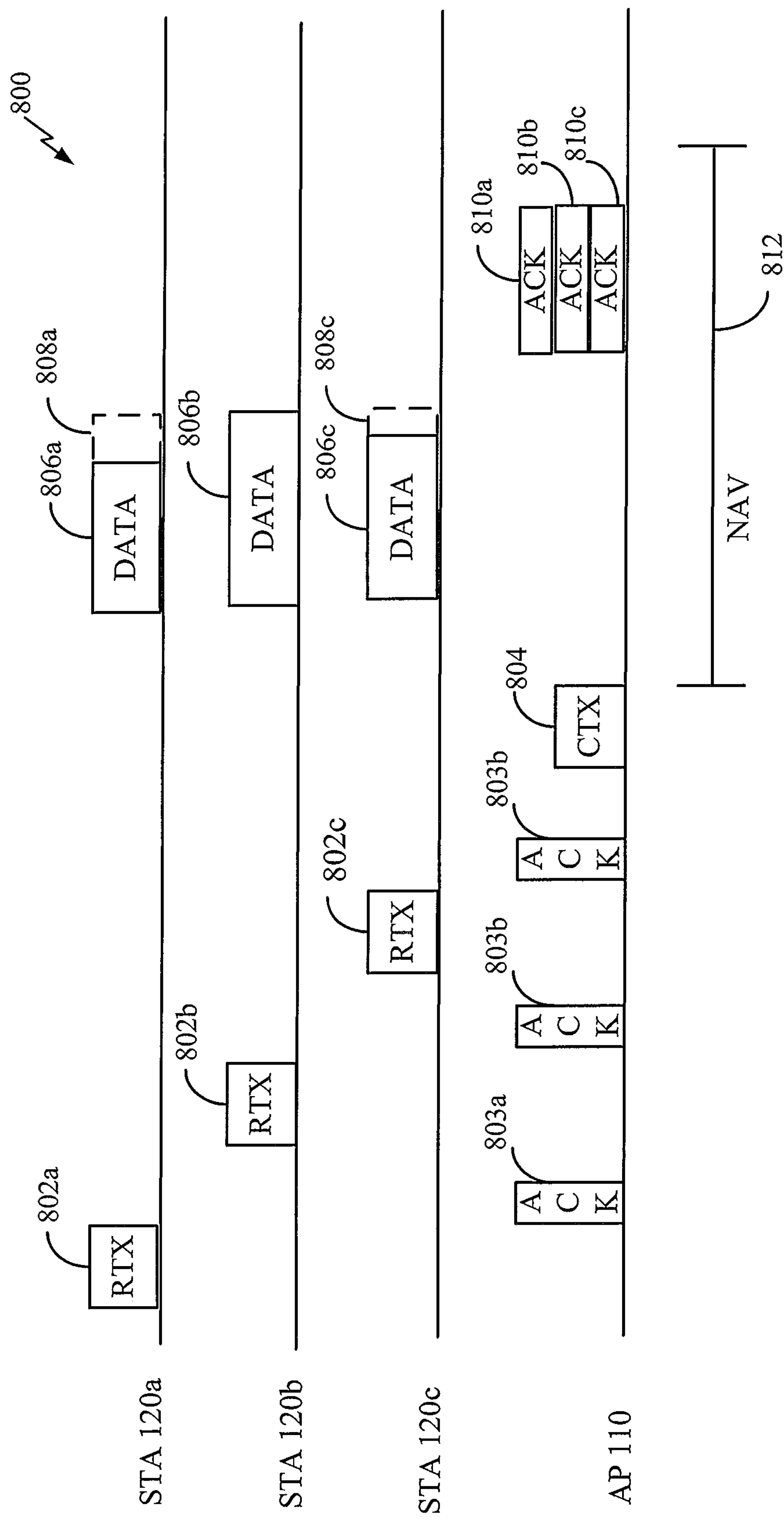
FIG. 8 is a message timing diagram of one embodiment of multi-user uplink communication.

FIG. 8 is a message timing diagram of one embodiment of multi-user uplink communication. Message exchange 800 shows communication of wireless messages between an AP 110 and three stations 120*a-c*. Message exchange 800 indicates that each of STAs 120*a-c* transmits a request-to-transmit (RTX) message 802*a-c* to the AP 110. Each of RTX messages 802*a-c* indicate that the transmitting station 120*a-c* has data available to be transmitted to the AP 110.

After receiving each of RTX messages 802*a-c*, the AP 110 may respond with a message indicating that the AP 110 has received the RTX. As shown in FIG. 8, the AP 110 transmits ACK messages 803*a-c* in response to each RTX messages 802*a-c*. In some embodiments, the AP 110 may transmit a message (e.g., a CTX message) indicating that each of the RTX messages 802*a-c* has been received but that the AP 110 has not granted a transmission opportunity for the stations 120*a-c* to uplink data. In FIG. 8, after sending ACK message 803*c*, the AP 110 transmits a CTX message 804. In some aspects, the CTX message 804 is transmitted to at least the stations STA 120*a-c*. In some aspects, the CTX message 804 is broadcast. In some aspects, the CTX message 804 indicates which stations are granted permission to transmit data to the AP 110 during a transmission opportunity. The starting time of the transmission opportunity and its duration may be indicated in the CTX message 804 in some aspects. For example, the CTX message 804 may indicate that the stations STA 120*a-c* should set their network allocation vectors to be consistent with NAV 812.

At a time indicated by the CTX message 804, the three stations 120*a-c* transmit data 806*a-c* to the AP 110. The data 806*a-c* are transmitted at least partially concurrently during the transmission opportunity. The transmissions of data 806*a-c* may utilize uplink multi-user multiple input, multiple output transmissions (UL-MU-MIMO) or uplink frequency division multiple access (UL-FDMA).

Figure 9:
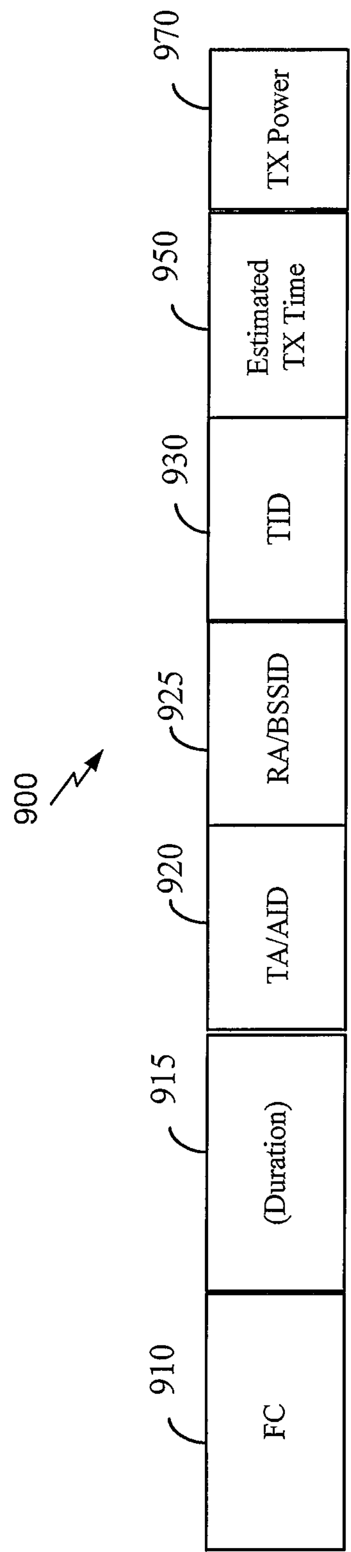
FIG. 9 shows a diagram of one embodiment of a request to transmit (RTX) frame.

FIG. 9 is a diagram of one embodiment of a RTX frame 900. The RTX frame 900 includes a frame control (FC) field 910, a duration field 915 (optional), a transmitter address (TA)/allocation identifier (AID) field 920, a receiver address (RA)/basic service set identifier (BSSID) field 925, a TID field 930, an estimated transmission (TX) time field 950, and a TX power field 970. The FC field 910 indicates a control subtype or an extension subtype. The duration field 815 indicates to any receiver of the RTX frame 900 to set the network allocation vector (NAV). In one aspect, the RTX frame 900 may not have a duration field 815. The TA/AID field 920 indicates the source address which can be an AID or a full MAC address. The RA/BSSID field 925 indicates the RA or BSSID. In one aspect the RTX frame may not contain a RA/BSSID field 925. The TID field 930 indicates the access category (AC) for which the user has data. The Estimated TX time field 950 indicates the time requested for the UL-TXOP and may be the time required for a user terminal 120 to send all the data in its buffer at the current planned MCS. The TX power field 970 indicates the power at which the frame is being transmitted and can be used by the AP to estimate the link quality and adapt the power backoff indication in a CTX frame.

Figure 10:
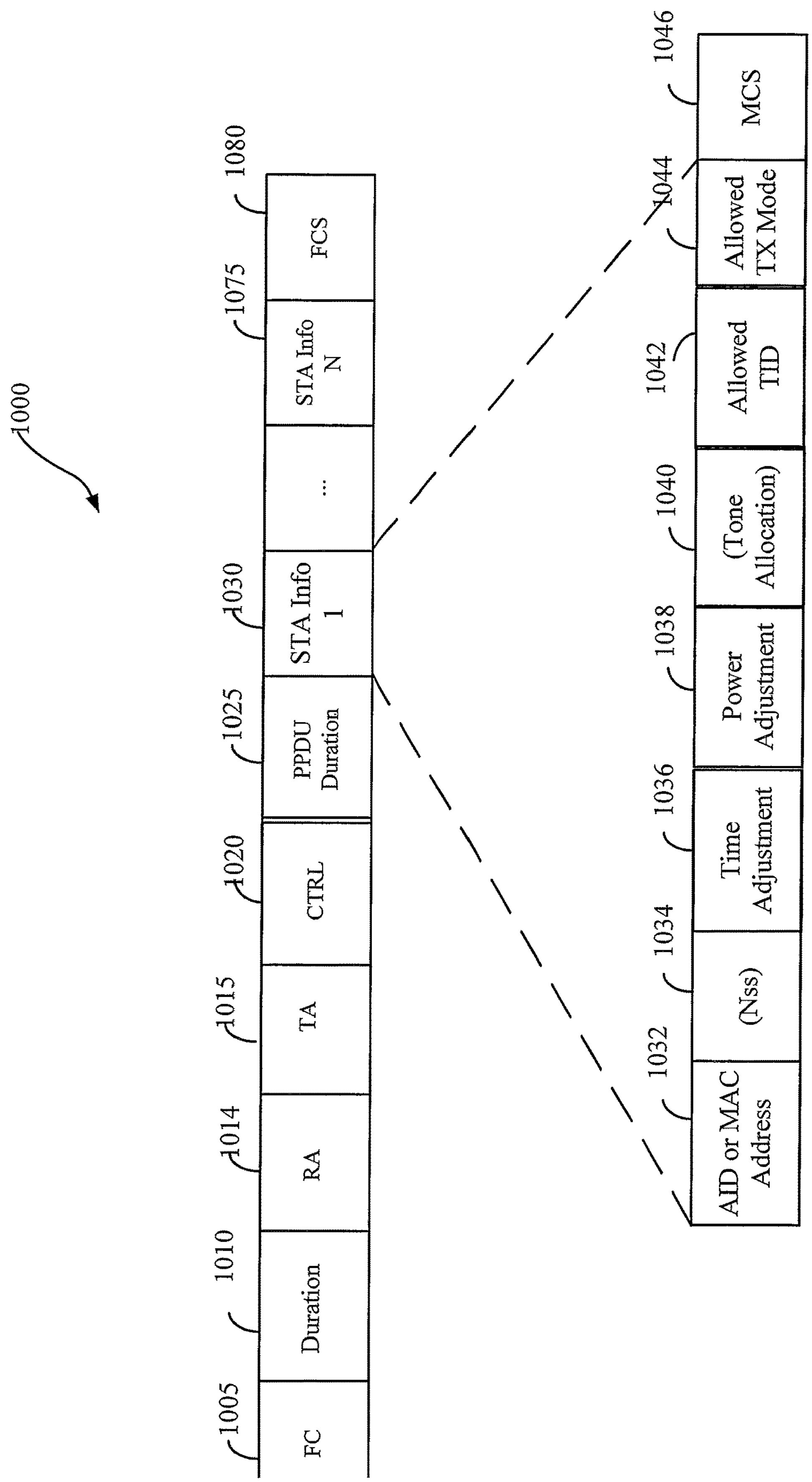
FIG. 10 shows a diagram of one embodiment of a clear to transmit (CTX) frame.

As discussed above, the CTX message 402 may be used in a variety of communications. FIG. 10 is a diagram of an example of a CTX frame 1000 structure. In this embodiment, the CTX frame 1000 is a control frame that includes a frame control (FC) field 1005, a duration field 1010, a receiver address field 1014, a transmitter address (TA) field 1015, a control (CTRL) field 1020, a PPDU duration field 1025, a STA info field 1030, and a frame check sequence (FCS) field 1080. The FC field 1205 indicates a control subtype or an extension subtype. The duration field 1010 indicates to any receiver of the CTX frame 1000 to set the network allocation vector (NAV). In some embodiments the RA 1014 field identifies a group of STAs through a multicast MAC address. The TA field 1015 indicates the transmitter address or a BSSID. The CTRL field 1020 is a generic field that may include information regarding the format of the remaining portion of the frame (e.g., the number of STA info fields and the presence or absence of any subfields within a STA info field), indications for rate adaptation for the user terminals 120, indication of allowed TID, and indication that a CTS must be sent immediately following the CTX frame 1000. The CTRL field 1020 may also indicate if the CTX frame 1000 is being used for UL MU MIMO or for UL FDMA or both, indicating whether a Nss or Tone allocation field is present in the STA Info field 1030.

Alternatively, the indication of whether the CTX is for UL MU MIMO or for UL FDMA can be based on the value of the subtype. Note that UL MU MIMO and UL FDMA operations can be jointly performed by specifying to a STA both the spatial streams to be used and the channel to be used, in which case both fields are present in the CTX; in this case, the Nss indication is referred to a specific tone allocation. The PPDU duration 1025 field indicates the duration of the following UL-MU-MIMO PPDU that the user terminals 120 are allowed to send. The STA Info 1030 field contains information regarding a particular STA and may include a per-STA (per user terminal 120) set of information (see STA Info 1 1030 and STA Info N 1075). The STA Info 1030 field may include an AID or MAC address field 1032 which identifies a STA, a number of spatial streams field (Nss) 1034 field which indicates the number of spatial streams a STA may use (in an UL-MU-MIMO system), a Time Adjustment 1036 field which indicates a time that a STA should adjust its transmission compared to the reception of a trigger frame (the CTX in this case), a Power Adjustment 1038 field which indicates a power backoff a STA should take from a declared transmit power, a Tone Allocation 1040 field which indicates the tones or frequencies a STA may use (in a UL-FDMA system), an Allowed TID 1042 field which indicates the allowable TID, an Allowed TX Mode 1044 field which indicates the allowed TX modes, and a MCS 1046 field which indicates the MCS the STA should use. A user terminal 120 receiving a CTX with a Allowed TID 1042 indication may be allowed to transmit data only of that TID, data of the same or higher TID, data of the same or lower TID, any data, or only data of that TID first, then if no data is available, data of other TIDs. The FCS 1080 field indicates the carries an FCS value used for error detection of the CTX frame 1000.

Figure 11:
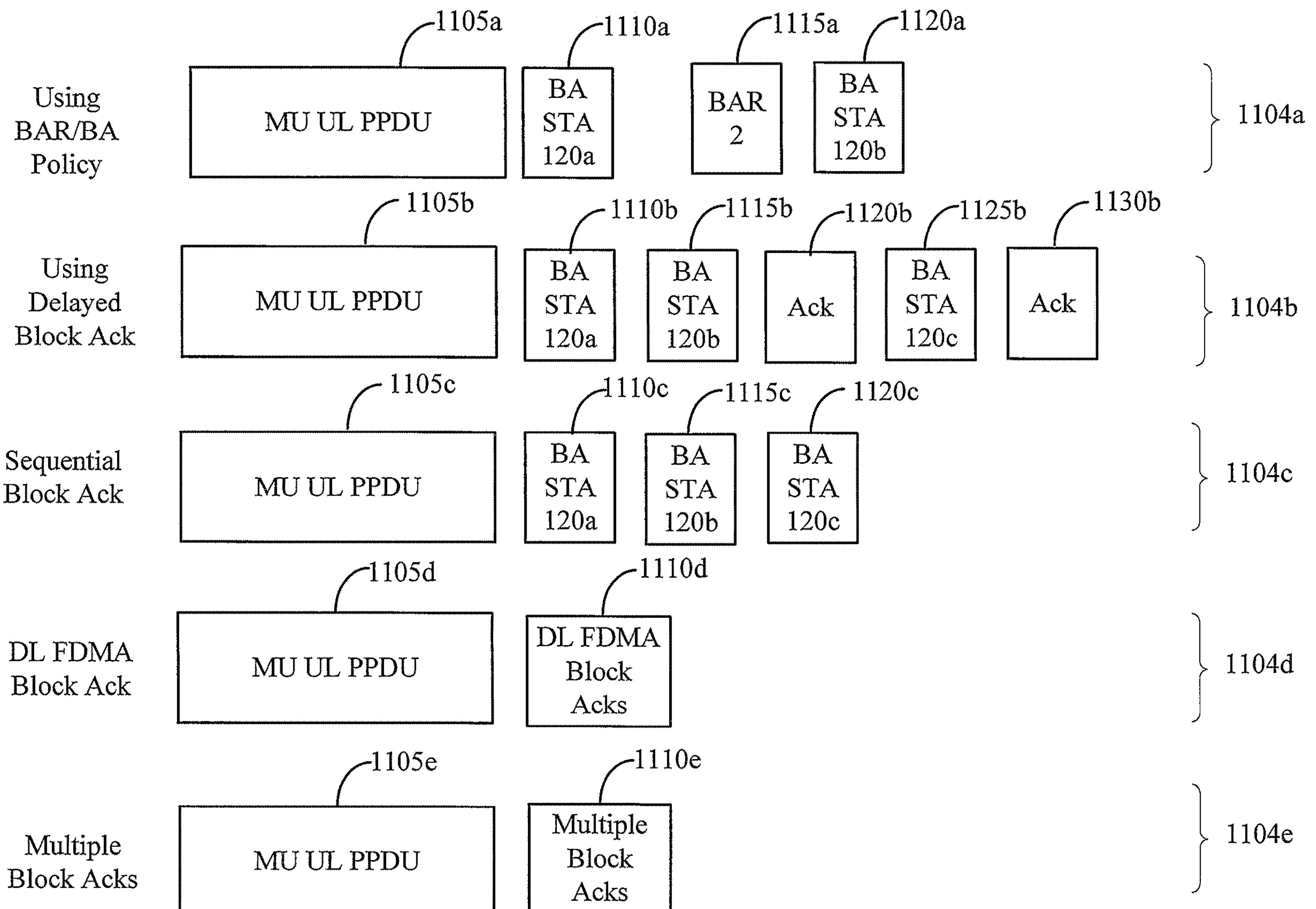
FIG. 11 shows a variety of message exchanges that demonstrate acknowledgment methods that may be employed by one or more of the disclosed embodiments.

FIG. 11 shows a variety of message exchanges that demonstrate acknowledgment methods that may be employed by one or more of the disclosed embodiments. Message exchange 1104*a* shows a multi-user uplink 1105*a* from at least two different stations 120*a* and 120*b*, being transmitted to an access point 110. In message exchange 1104*a*, only one station is allowed to set the block acknowledgment policy to immediate block ack or normal acknowledgment (acknowledgment of a single frame). In message exchange 1104, STA 120*a* has an immediate block acknowledgement policy. Therefore, after reception of the multi-user uplink PPDU 1105*a*, a block acknowledgment is transmitted to STA 120*a*. After a period of time, STA 120*b* transmits a block acknowledgment request 1115*a* to the AP 110. Upon receiving the block acknowledgment request 1115*a*, the AP 110 transmits the block acknowledgment 1120*a* to the STA 120*b*.

Message exchange 1104*b* shows a multi-user uplink PPDU 1105*d* transmitted by at least three different stations 120*a*, 120*b*, and 120*c*. In response to receiving the multi-user uplink 1105*b*, the AP 110 transmits a first block ack 1110*b* to STA 120*a* and a second block ack 1115*b* to STA 120*b*. A third block acknowledgment 1125*b* is transmitted to STA 120*c*. Two acknowledgment frames 1120*b* and 1130*b* are also transmitted.

Message exchange 1104*c* shows a multi-user uplink PPDU 1105*c* transmitted by at least three different stations 120*a*, 120*b*, and 120*c*. The uplink 1105*c* is received by an access point 110. In the embodiment of 1104*c*, the access point may send block acknowledgments for the PPDU's transmitted as part of the uplink transmission 1105*b* at any time, with contention. Therefore, after completion of the transmission of the uplink PPDU 1105*c*, the AP 110 transmits separate individual block acknowledgments 1110*c*, 1115*c*, and 1120*c* to each of the stations 120*a-c*.

Message exchange 1104*d* shows a multi-user uplink PPDU 1105*d* transmitted by at least two stations 120*a* and 120*b*. After reception of the uplink 1105*d*, the AP 110 transmits via downlink frequency division multiplexing (FDMA) multiple block acknowledgments 1110*d* to the at least two stations 120*a* and 120*b*, at least partially concurrently. In some other aspects, the multiple block acknowledgments 1110*d* may be transmitted via downlink multi-user MIMO.

Message exchange 1104*e* shows a multi-user uplink PPDU 1105*e* transmitted by at least two stations 120*a* and 120*b*. After reception of the uplink 1105*e*, the AP 110 transmits a single block acknowledgment message 1110*e* to at least two stations 120*a* and 120*b*.

Figure 12:
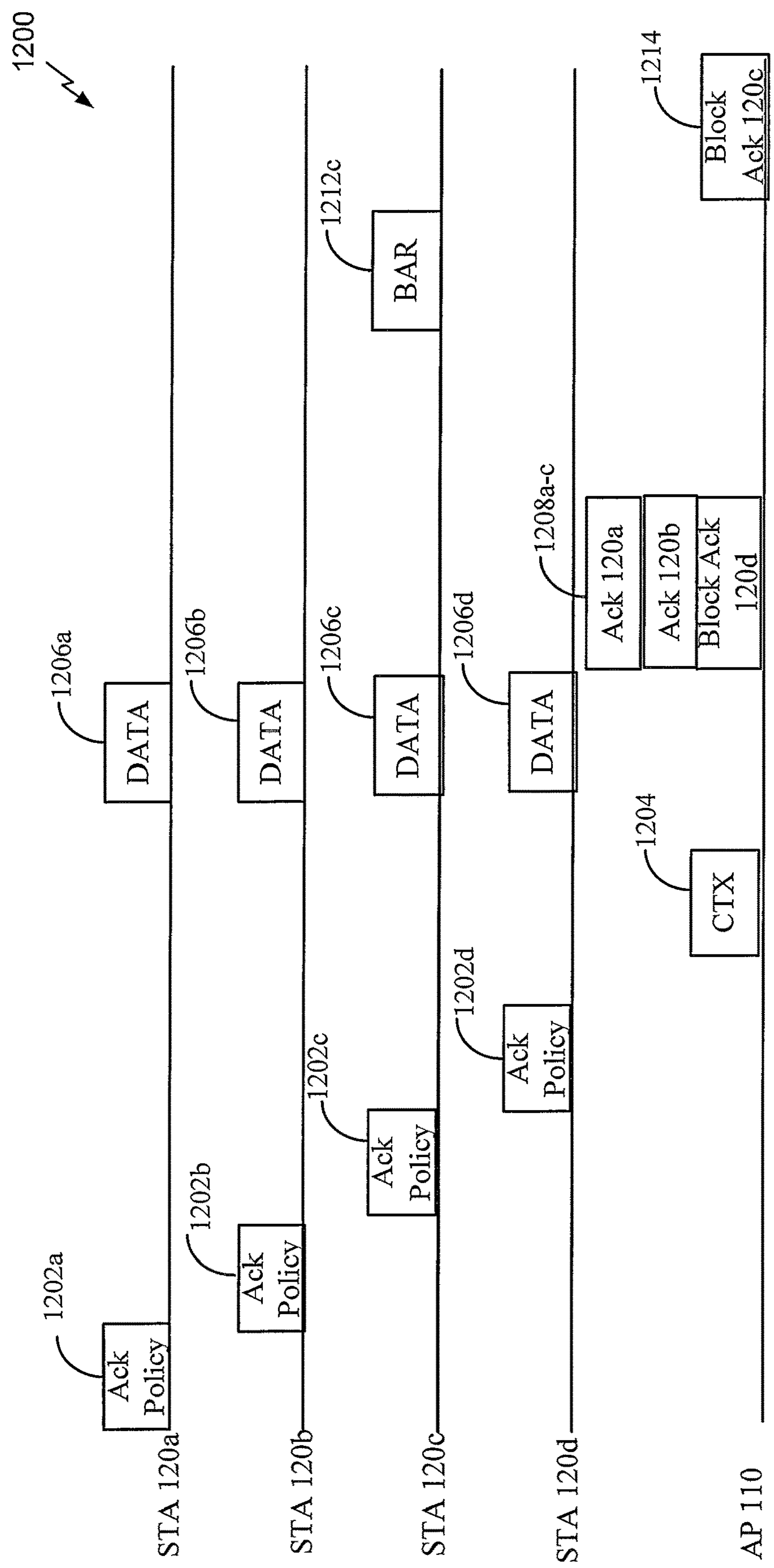
FIG. 12 is a message flow diagram illustrating a uplink multi user transmission.

FIG. 12 is a message flow diagram illustrating a uplink multi user transmission. The exemplary message exchange 1200 is performed by four stations STA 120*a-d* and an access point 110. Initially, each of the stations 120*a-d* transmits an acknowledgment policy message 1202*a-d* to the AP 110. In some aspects, the acknowledgment policy is a request to transmit message. The acknowledgment policy message may indicate how data transmitted by each of the stations 120*a-d* respectively should be acknowledged by the access point. For example, in some aspects, each acknowledgment policy message 1202*a-d* may indicate whether the station requests an acknowledgment for each message, an immediate block acknowledgment, or delayed block acknowledgments.

In some aspects, the AP 110 may respond to the acknowledgment policy messages 1202*a-d* with a clear to transmit message 1204. In some aspects, one clear to transmit message 1204 will be transmitted to all four of the stations 120*a-d*. In some other aspects, multiple clear to transmit messages may be transmitted (not shown). The clear to transmit message may provide information regarding a start time and a duration of a transmission opportunity during which the stations 120*a-d* are granted permission to transmit data. In some aspects, the clear to transmit message 1204 may indicate to one or more stations a time at which it can expect an acknowledgement for data sent during the transmission opportunity. For example, a station may request regular acknowledgments in an acknowledgment policy message, such as messages 120*a-d*. However, due to the fact that multiple STAs need to be acknowledged after a multi-user transmission, in some aspects not all stations can be acknowledged immediately.

Note that while FIG. 12 shows the clear to transmit message 1204 being transmitted immediate after transmission of the acknowledgment policy messages 1202*a-d*, in some aspects, a variable amount of time and/or wireless frames may be present between any of the acknowledgment policy messages 1202*a-d* and the clear to transmit message 1204.

Therefore, the clear to transmit message 1204 may allow the AP 110 to coordinate acknowledgment timing for each of the stations expected to transmit during the transmission opportunity. In embodiments that transmit multiple CTX messages, the acknowledgment timing information may be provided in each CTX message, as appropriate for the device to which each of the multiple CTX messages is transmitted.

In response to receiving the clear to transmit message 1204, each of the stations 120*a-d* transmits a data message 1206*a-d* respectively to the access point 110. The data messages 1206*a-d* are transmitted at least partially simultaneously. In some aspects, the data messages 1206*a-d* may be transmitted using uplink multi-user MIMO and in some other aspects the data messages 1206*a-d* may be transmitted using uplink FDMA.

After receiving the uplink transmission comprised of data messages 1206*a-d*, the AP determines how it should acknowledge each of the data messages 1206*a-d*. In the illustrated aspect, the AP initially responds to the data messages 1206*a-d* by transmitting acknowledgements 1208*a-c* to STAs 120, STA 120*b*, and STA 120*d*. The AP acknowledges STA 120*a*, STA 120*b*, and STA 120*d* immediately after reception of the data messages 1206*a-d* in this aspect because acknowledgment policy messages 1202*a-b* and 1202*d* indicated the stations 120*a-b* and 120*d* requested regular acknowledgments and immediate block acknowledgments respectively. The three acknowledgment messages 1208*a-c* are transmitted at least partially simultaneously. In some aspects, the acknowledgment messages 1208*a-c* may be transmitted using downlink multi-user MIMO or downlink FDMA.

Acknowledgment policy message 1202*c* indicated to the AP 110 that STA 120*c* requests delayed block acknowledgments. Thus, STA 120*c* transmits a block acknowledgment request 1212*c* to the AP 110. In response, the AP 110 transmits block acknowledgment message 1214.

Figure 13:
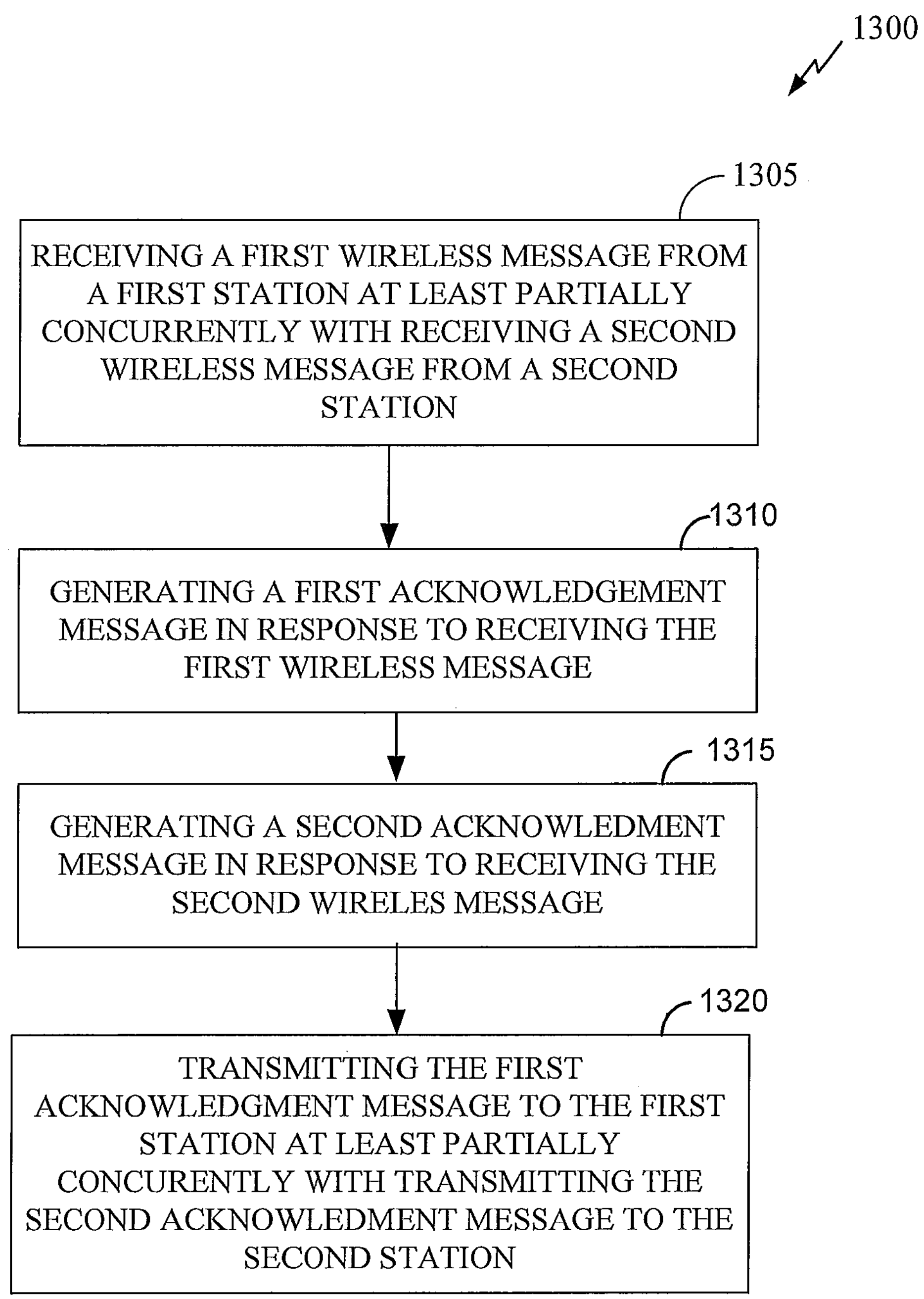
FIG. 13 is a method of acknowledging a wireless message.

FIG. 13 is a method of acknowledging a wireless message. The method 1300 may be performed, in some aspects, by the wireless device 302, and/or an AP 110 and/or any of STA's 120 discussed above. Process 1300 may provide for the transmission of a plurality of acknowledgment messages to a multi-user transmission at least partially in parallel or concurrently. By transmitting acknowledgment messages concurrently, greater utilization of a wireless medium may be achieved. For example, in some aspects, process 1300 provides for the transmission of multiple acknowledgments to multiple stations using downlink FDMA or downlink multi-user MIMO. In some aspects, this capability allows acknowledgments to occur synchronously with their respective data. Thus, a greater percentage of the wireless medium utilization can be used for the transmission of data messages. This contrasts with solution that might instead follow a multi-user uplink transmission with a period of serial acknowledgments for each of the multi-user uplink transmissions.

In block 1305, a first wireless message is received from a first station at least partially concurrently with reception of a second wireless message from a second station. In some aspects, the first and second wireless messages are received via uplink multi-user MIMO, while in other aspects, the first and second wireless messages are received via uplink frequency division multiple access. (UL-FDMA). In some aspects, a third and possibly fourth wireless message from a third and fourth station may also be received at least partially concurrently with the first and second wireless messages. These third and fourth messages may also be part of the UL-FDMA or UL-MU-MIMO transmission.

Some aspects of method 1300 include receiving a message from a station indicating an acknowledgment policy for the station. For example, the acknowledgment policy message may indicate whether the station requests regular acknowledgments, immediate block acknowledgments, or delayed block acknowledgments. In some aspects, an acknowledgment policy message may be received from one or more of the first, second, third or fourth stations discussed above.

Some aspects of block 1305 include transmitting one or more clear to transmit message(s) to one or more of the first, second, third, and fourth stations discussed above. In some aspects, the clear to transmit messages are generated to indicate a time when the first, second, third, and/or fourth messages may be transmitted to the device performing method 1300.

In block 1310 a first acknowledgment message is generated in response to receiving the first wireless message. The first acknowledgment message is generated to provide an acknowledgment of the first wireless message received in block 1305. The first acknowledgment message may be generated to acknowledge just the first wireless message, or may be generated as a block acknowledgment to acknowledge a single frame or multiple frames. In some aspects, how the first acknowledgment message is generated is based on an acknowledgment policy for the first station.

In block 1315, a second acknowledgment message is generated in response to receiving the second wireless message. The second acknowledgement message is generated to provide an acknowledgement of the second wireless message received in block 1305. The second acknowledgment message may be generated to acknowledge just the second wireless message, or may be generated as a block acknowledgment to acknowledge a single frame or multiple frames. In some aspects, how the second acknowledgment message is generated is based on an acknowledgment policy for the second station.

In some aspects, generation of the first and/or second acknowledgment messages are based on acknowledgment policy messages received from the respective first and second stations as discussed above. For example, the acknowledgment policy messages may have been decoded to determine that the first and second stations request immediate block acknowledgments or acknowledgments of a single frame. These acknowledgment policies may allow the device performing process 1300 to transmit acknowledgments to the first and second wireless messages in parallel using downlink multi-user MIMO or downlink FDMA as discussed below.

In block 1320, the first and second acknowledgment messages are transmitted to the first and second stations respectively. The two messages are transmitted at least partially concurrently. In some aspects, the concurrent transmission is accomplished using downlink frequency division multiple access (DL-FDMA) and in some other aspects, the transmission is accomplished using downlink multi-user MIMO (DL-MU-MIMO).

In some aspects, the first acknowledgment message is transmitted on a spatial stream that is based on a second spatial stream upon which the first wireless message was received. For example, in some aspects, the first acknowledgment message is transmitted over the same spatial stream upon which the first wireless message was received. Similarly, transmission of the second acknowledgment message may be performed over a spatial stream that is based upon a spatial stream upon which the second wireless message was received. Similar to the example above for the first wireless message, in some aspects, the second wireless message may also be transmitted over the same spatial stream over which the second wireless message was received.

In some aspects that use DL-FMDA to transmit the acknowledgment messages, the first acknowledgment message may be transmitted over a frequency band over which the first wireless message was received, or the frequency band may at least be based on the frequency band over which the first wireless message was received. Similarly, in some aspects, the second acknowledgment message may be transmitted over the same frequency band over which the second wireless message was received, or at least a frequency band that is based on the frequency band of the second wireless message.

In some aspects, acknowledgment policy messages that may be received from the third and potentially fourth station discussed above may indicate that these stations request delayed block acknowledgments. In these aspects, acknowledgments for the third and possibly fourth wireless messages may not be generated in immediate response to reception of the third and fourth wireless messages in block 1305, but may instead be transmitted at a later time.

For example, in some aspects, the acknowledgments to the third and potentially fourth wireless messages discussed above may be transmitted to the third and fourth devices in response to reception of a block acknowledgment request from each of the third and fourth stations respectively, as shown for example, in FIG. 12 with respect to block acknowledgment request 1212*c* and block acknowledgment 1214.

Figure 14:
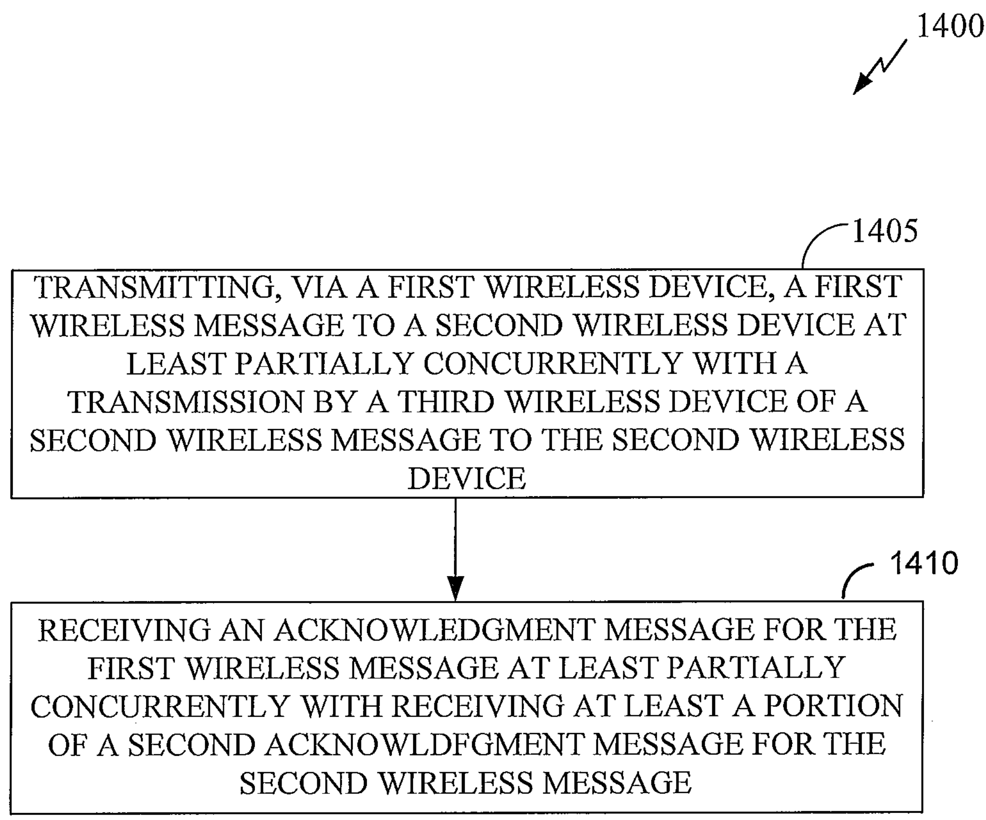
FIG. 14 is a flowchart of a method of receiving acknowledgment of a wireless message.

FIG. 14 is a flowchart of a method of receiving acknowledgment of a wireless message. The method 1400 may be performed, in some aspects, by the wireless device 302, and/or an AP 110 and/or any of STA's 120 discussed above.

Process 1400 may provide for the reception of a plurality of acknowledgment messages for a multi-user transmission at least partially in parallel or concurrently. By multiple devices receiving acknowledgment messages concurrently, greater utilization of a wireless medium may be achieved. For example, in some aspects, process 1400 provides for the reception of multiple acknowledgments by multiple stations using downlink FDMA or downlink multi-user MIMO. In some aspects, this capability allows acknowledgments to occur synchronously with their respective data. Thus, a greater percentage of the wireless medium utilization can be used for the transmission of data messages. This contrasts with solution that might instead follow a multi-user uplink transmission with a period of serial acknowledgments for each of the multi-user uplink transmissions.

In block 1405, a first wireless device transmits a first wireless message to a second wireless device at least partially concurrently with a transmission by a third wireless device of a second wireless message to the second wireless device. In some aspects, the transmission of the first wireless message is part of a multi-user uplink transmission by a plurality of stations to an access point. In some aspects, the transmission is performed using uplink multi-user MIMO, while in some other aspects, the transmission is performed using uplink FDMA. For example, the first wireless message may be transmitted over a first spatial stream while the second wireless message is transmitted by the third wireless device over a second spatial stream. Alternatively, the first wireless message may be transmitted over a first frequency while the second wireless message is transmitted over a second frequency.

In some aspects, of process 1400, a third wireless message is generated. The third wireless message indicates an acknowledgment policy for acknowledging the first wireless message. For example, in some aspects, the third wireless message is a request to transmit message. The third message may be transmitted to the second wireless device, which may be an access point in some aspects. In some aspects, the third wireless message is generated to indicate an acknowledgment policy of immediate block acknowledgment or normal acknowledgment (acknowledgment of a single frame).

Some aspects of process 1400 include receiving a clear to transmit message, and decoding the clear to transmit message to determine a time to transmit the first wireless message. These aspects may also include transmitting the first wireless message in block 1405 at the determined time.

In block 1410, an acknowledgement message for the first wireless message is received from the second wireless device. The acknowledgment is received at least partially concurrently with at least a portion of a second acknowledgment message, transmitted by the second wireless device, for the second wireless message. The second acknowledgment message may not be addressed to the first wireless device, but at least a portion of it, for example, at least a preamble, may be received by the first wireless device.

In some aspects, the third wireless message discussed above may be generated to indicate an acknowledgment policy of delayed block acknowledgment. In these aspects, process 1400 may include transmission of a fourth wireless message to the second wireless device at least partially concurrently with a transmission by a fourth wireless device or the third wireless device of a fifth wireless message to the second wireless device. The fourth and fifth wireless messages may comprise a second multi-user uplink transmission transmitted using either UL-MU-MIMO or UL-FDMA.

After transmission of the fourth wireless message, a block acknowledgment message may be transmitted by the first wireless device to the second wireless device. This block acknowledgment request message may request acknowledgment of at least the fourth wireless message. After transmitting the block acknowledgment request, a block acknowledgment may be received from the second wireless device, in some aspects indicating whether the fourth wireless message was properly received by the second wireless device. Thus, even though the fourth wireless message was transmitted currently with the fifth wireless message by another wireless device, the acknowledgment of the fourth wireless message may be independent of any acknowledgment of the fifth wireless message.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:

receiving, at a first wireless device, a clear to transmit message from a second wireless device, the clear to transmit message indicating a time when the first wireless device is to transmit a first wireless message;

transmitting, at the first wireless device, the first wireless message to the second wireless device at least partially simultaneously with a transmission by a third wireless device of a second wireless message to the second wireless device and with a transmission by a fourth wireless device of a third wireless message to the second wireless device;

receiving, at the second wireless device, at least a portion of a fourth wireless message sent to the second wireless device, the fourth wireless message indicating an acknowledgment policy for the fourth wireless device;

receiving, at the first wireless device, at least a portion of a first acknowledgment message in response to the first wireless message, at least partially simultaneously with receiving, at the third wireless device, at least a portion of a second acknowledgment message in response to the second wireless message;

receiving, at the second wireless device, at least a portion of a fifth wireless message from the fourth wireless device after receiving at least the portion of the fourth wireless message, the fifth wireless message requesting a block acknowledgment for the fourth wireless device; and receiving, at the fourth wireless device, at least a portion of a third acknowledgment message in response to the fifth wireless message, wherein the third acknowledgement message is received by the fourth wireless device after the first wireless device receives the first acknowledgement message and the third wireless device receives the second acknowledgment message, and wherein the third acknowledgement message is the block acknowledgment.

2. The method of claim 1, further comprising:

decoding, at the first wireless device, the clear to transmit message to determine the time to transmit the first wireless message; and wherein transmitting the first wireless message is at the determined time.

3. The method of claim 1, further comprising transmitting, via the first wireless device, an acknowledgment policy message indicating delayed block acknowledgments are requested.

4. The method of claim 1, further comprising receiving, at the first wireless device, the at least a portion of the first acknowledgment message in response to the first wireless message over a first spatial stream and receiving, at the third wireless device, the at least a portion of the second acknowledgment message in response to the second wireless message over a second spatial stream.

5. The method of claim 1, further comprising receiving, at the first wireless device, the at least a portion of the first acknowledgment for the first acknowledgment message over a first frequency and receiving, at the third wireless device, the at least a portion of the second acknowledgment message over a second frequency.

6. A first wireless device, comprising:
- a network interface;
- a non-transitory computer-readable medium; and
- a processor in communication with the network interface and the non-transitory computer-readable medium, and capable of executing processor-executable program code stored in the non-transitory computer-readable medium, that causes the first wireless device to perform a method of wireless communication, comprising:
- receiving a clear to transmit message from an access point, the clear to transmit message indicating a time when the first wireless device is to transmit a first wireless message;
- transmitting the first wireless message to the access point at least partially simultaneously with a transmission by a third wireless device of a second wireless message to the access point and with a transmission by a fourth wireless device of a third wireless message to the access point;
- receiving at least a portion of a first acknowledgement message in response to the first wireless message, at least partially simultaneously with receiving, at the third wireless device, at least a portion of a second acknowledgement message in response to the second wireless message;
- wherein, the access point is configured to receive:
  - at least a portion of a fourth wireless message sent to the access point, the fourth wireless message indicating an acknowledgement policy for the fourth wireless device;
  - at least a portion of a fifth wireless message from the fourth wireless device after receiving at least a portion of the fourth wireless message, the fifth wireless message requesting a block acknowledgement for the fourth wireless device; and
- wherein, the fourth wireless device is configured to receive:
  - at least a portion of a third acknowledgement message in response to the fifth wireless message, and wherein the third acknowledgement message is received by the fourth wireless device after the first wireless device receives the first acknowledgement message and the third wireless device receives the second acknowledgment message, and wherein the third acknowledgement message is the block acknowledgment.

7. The first wireless device of claim 6, wherein the processor is configured to generate a sixth wireless message, the sixth wireless message indicating an acknowledgment policy for acknowledging the first wireless message.

8. The first wireless device of claim 7, wherein the processor is further configured to transmit the sixth wireless message to the second wireless device.

9. The first wireless device of claim 8, wherein the processor is further configured to generate the sixth wireless message to indicate an acknowledgment policy of immediate block acknowledgment or acknowledgment of a single frame.

10. The first wireless device of claim 6, wherein the processor is configured to decode the clear to transmit message to determine the time to transmit the first wireless message.

11. The first wireless device of claim 10, wherein the processor is further configured to transmit the first wireless message at the determined time.

12. The first wireless device of claim 6, wherein the processor is further configured to transmit an acknowledgment policy message indicating delayed block acknowledgments are requested.

13. The first wireless device of claim 6, wherein the processor is further configured to receive the acknowledgement for the first wireless message over a first spatial stream and receive the second acknowledgment message over a second spatial stream.

14. The first wireless device of claim 6, wherein the processor is further configured to receive the acknowledgment for the first acknowledgment message over a first frequency and receive the second acknowledgment message over a second frequency.

15. A non-transitory computer-readable medium comprising instructions that when executed by a computer causes the computer to perform a method of wireless communication, comprising:
- receiving, at a first wireless device, a clear to transmit message from a second wireless device, the clear to transmit message indicating a time when the first wireless device is to transmit a first wireless message;
- transmitting, at the first wireless device, the first wireless message to the second wireless device at least partially concurrently with a transmission by a third wireless device of a second wireless message to the second wireless device and with a transmission by a fourth wireless device of a third wireless message to the second wireless device;
- receiving, at the second wireless device, at least a portion of a fourth wireless message sent to the second wireless device, the fourth wireless message indicating an acknowledgment policy for the fourth wireless device;
- receiving, at the first wireless device, at least a portion of a first acknowledgment message for the first wireless message, at least partially concurrently with receiving, at the third wireless device, at least a portion of a second acknowledgment message for the second wireless message;
- receiving, at the second wireless device, at least a portion of a fifth wireless message from the fourth wireless device after receiving at least the portion of the fourth wireless message, the fifth wireless message requesting a block acknowledgment for the fourth wireless device; and
- receiving, at the fourth wireless device, at least a portion of a third acknowledgment message for the fifth wireless message, wherein
- the third acknowledgement message is received by the fourth wireless device after the first wireless device receives the first acknowledgement message and the third wireless device receives the second acknowledgment message, and wherein the third acknowledgement message is the block acknowledgment.

16. The non-transitory computer-readable medium of claim 15, further comprising:
- decoding, at the first wireless device, the clear to transmit message to determine the time to transmit the first wireless message; and wherein transmitting the first wireless message is at the determined time.

17. The non-transitory computer-readable medium of claim 15, further comprising transmitting, via the first wireless device, an acknowledgment policy message indicating delayed block acknowledgments are requested.

18. The non-transitory computer-readable medium of claim 15, further comprising receiving, at the first wireless device, the at least a portion of the first acknowledgment message in response to the first wireless message over a first spatial stream and receiving, at the third wireless device, the at least a portion of the second acknowledgment message in response to the second wireless message over a second spatial stream.

19. The non-transitory computer-readable medium of claim 15, further comprising receiving, at the first wireless device, the at least a portion of the first acknowledgment message in response to the first wireless message over a first frequency and receiving, at the third wireless device, the at least a portion of the second acknowledgment message in response to the second wireless message over a second frequency.

* * * * *